US008689256B2

(12) United States Patent  
Otsu et al.

(10) Patent No.: US 8,689,256 B2  
(45) Date of Patent: Apr. 1, 2014

(54) PORTABLE TERMINAL, DISPLAYING METHOD, AND STORAGE MEDIUM

(75) Inventors: Shuichi Otsu, Kanagawa (JP); Junichi Nakamura, Chiba (JP); Naoki Yuasa, Chiba (JP); Hideki Sato, Kanagawa (JP); Hiroki Hashi, Tokyo (JP); Mie Namai, Tokyo (JP)

(73) Assignee: Sony Corporation, Tokyo (JP)

( * ) Notice: Subject to any disclaimer, the term of this patent is extended or adjusted under 35 U.S.C. 154(b) by 704 days.

(21) Appl. No.: 11/941,423

(22) Filed: Nov. 16, 2007

(65) Prior Publication Data

US 2008/0141304 A1 Jun. 12, 2008

(30) Foreign Application Priority Data

Dec. 12, 2006 (JP) ................................. 2006-334518

(51) Int. Cl.
*G06F 3/00* (2006.01)
*G06F 13/00* (2006.01)
*H04N 5/445* (2011.01)

(52) U.S. Cl.
USPC ............................................ 725/40; 386/243

(58) Field of Classification Search
USPC ................ 725/39–61, 80, 100, 109, 115, 725/131–134, 139–142, 151–153; 386/243
See application file for complete search history.

(56) References Cited

U.S. PATENT DOCUMENTS

| 6,407,776 B1* | 6/2002 | Sekimoto et al. ............. 348/553 |
| 2002/0122080 A1* | 9/2002 | Kunii et al. .................... 345/864 |
| 2003/0074673 A1* | 4/2003 | Nomura et al. ............... 725/114 |
| 2006/0031883 A1* | 2/2006 | Ellis et al. ...................... 725/58 |
| 2006/0092966 A1* | 5/2006 | Sitnik et al. ................... 370/463 |
| 2006/0277277 A1* | 12/2006 | Landschaft et al. ........... 709/220 |
| 2007/0172196 A1* | 7/2007 | Kusunoki et al. ............... 386/83 |
| 2007/0174871 A1* | 7/2007 | Kim et al. ....................... 725/41 |

FOREIGN PATENT DOCUMENTS

| JP | 2001-103579 | 4/2001 |
| JP | 2001-238157 | 8/2001 |
| JP | 2002-125181 | 4/2002 |
| JP | 2002-262188 | 9/2002 |
| JP | 2003-18517 | 1/2003 |
| JP | 2005-244878 | 9/2005 |

(Continued)

OTHER PUBLICATIONS

Translation of JP-2005-260313.*

(Continued)

*Primary Examiner* — Yassin Alata
(74) *Attorney, Agent, or Firm* — Oblon, Spivak, McClelland, Maier & Neustadt, L.L.P.

(57) ABSTRACT

A portable terminal includes an obtaining unit configured to obtain program information via a network from a providing apparatus that provides the program information, the program information being used to display a program guide; a program-information storing unit configured to store the program information obtained; a displaying unit configured to display the program guide according to the obtained program information; and a display controlling unit configured to control display of the program guide so that the program guide is displayed according to the program information stored in the program-information storing unit. When an instruction for displaying a program guide is received, the obtaining unit newly obtains program information for updating the program information stored in the program information storing unit from the providing apparatus if the portable terminal is connected to the providing apparatus via the network.

14 Claims, 11 Drawing Sheets

(56) References Cited

FOREIGN PATENT DOCUMENTS

| | | | |
|---|---|---|---|
| JP | 2005260313 A * | 9/2005 | |
| JP | 2006-101078 | 4/2006 | |
| JP | 2006-108752 | 4/2006 | |
| JP | 2006-203912 | 8/2006 | |
| JP | 2006-319955 | 11/2006 | |

OTHER PUBLICATIONS

U.S. Appl. No. 13/399,344, filed Feb. 17, 2012, Yuasa.

* cited by examiner

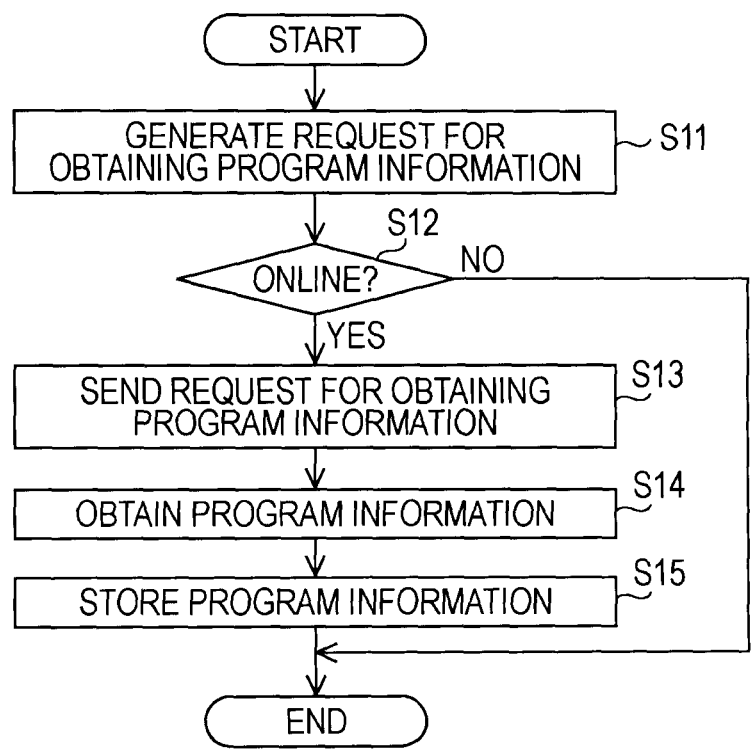

//PORTABLE TERMINAL, DISPLAYING METHOD, AND STORAGE MEDIUM

CROSS REFERENCES TO RELATED APPLICATIONS

The present invention contains subject matter related to Japanese Patent Application JP 2006-334518 filed in the Japanese Patent Office on Dec. 12, 2006, the entire contents of which are incorporated herein by reference.

BACKGROUND OF THE INVENTION

1. Field of the Invention

The present invention relates to portable terminals, displaying methods, and storage media. More specifically, the present invention relates to a portable terminal, a displaying method, and a storage medium with which a reservation for recording or viewing of a program can be made more easily.

2. Description of the Related Art

In an existing type of portable electronic device, program information, such as an electronic program guide (EPG) including information such as names, broadcast periods (or broadcast start times), and genres of programs of television broadcasting or the like, is obtained from received television broadcast waves or from a television receiver, hard disk recorder, or the like via a network, and an electronic program guide is displayed according to the obtained program information.

An example of such an electronic device is a remote control device that receives program information sent from a television receiver and that projects and displays a program guide on a projection target according to the received program information. Such a remote control device is described, for example, in Japanese Unexamined Patent Application Publication No. 2004-363930. With the remote control device, details regarding information selected by a cursor on the program guide is displayed. Thus, a user can view and check detailed information regarding programs without interrupting display of a program on a television receiver.

SUMMARY OF THE INVENTION

However, according to the techniques described above, if the environment of use of the portable electronic device that displays a program guide changes as the user moves with the electronic device, in some cases, the electronic device fails to display a program guide. More specifically, in the existing type of electronic device, program information that has been obtained is loaded in an internal memory and temporarily stored therein. Thus, when the electronic device is in an environment where it is not possible to obtain program information, for example, when the electronic device is not able to receive television broadcast waves or is not able to connect to a network immediately after activation of the electronic device, it is not possible to display a program guide on the electronic device. In such cases, the user is not allowed to check a program guide, so that it is difficult to select a program that the user wishes to record.

Furthermore, if the electronic device that displays a program guide has a function of sending a command to a recording apparatus connected via a home network, such as a hard disk recorder, so that a reservation for recording of a program can be made, when the electronic device is in an environment where it is not possible to connect the electronic device to a recording apparatus, for example, when the user has brought the electronic device out of home, even if the electronic device is able to obtain program information and to display a program guide after activation, it is not allowed to issue an instruction for reservation of recording to a recording apparatus using the electronic device. Thus, when it is not possible to connect the electronic device to a home network, the user is not allowed to make a reservation for recording of a program by a remote operation.

It is desired that a reservation for recording or viewing of a program can be made more easily.

According to an embodiment of the present invention, there is provided a portable terminal including obtaining means for obtaining program information via a network from a providing apparatus that provides the program information, the program information being used to display a program guide; program-information storing means for storing the program information obtained; displaying means for displaying the program guide according to the obtained program information; and display controlling means for controlling display of the program guide so that the program guide is displayed according to the program information stored in the program-information storing means. When an instruction for displaying a program guide is received, the obtaining means newly obtains program information for updating the program information stored in the program-information storing means from the providing apparatus if the portable terminal is connected to the providing apparatus via the network.

The displaying means may display an image indicating that the portable terminal is not connected to the providing apparatus, together with the program guide, if the portable terminal is not connected to the providing apparatus via the network.

When an instruction for displaying a program guide is received and if the portable terminal is connected to the providing apparatus via the network, the obtaining means may newly obtain program information from the providing apparatus if program information that is the same as the program information that is to be newly obtained from the providing apparatus is not stored in the program-information storing means.

The portable terminal may further include encrypting means for encrypting the program information. In this case, the program-information storing means stores the program information encrypted by the encrypting means.

The portable terminal may further include decrypting means for decrypting the encrypted program information stored in the program-information storing means. In this case, the displaying means displays the program guide according to the program information decrypted by the decrypting means.

The portable terminal may further include generating means for generating a setting request for requesting reservation for recording or viewing of a specified program to a device that is connected to the portable terminal via the network and that records the program or controls display of the program; setting-request storing means for storing the setting request generated by the generating means if the portable terminal is not connected to the device via the network; and sending means for sending the setting request generated by the generating means if the portable terminal is connected to the device via the network.

The sending means may send the setting request stored in the setting-request storing means when the portable terminal becomes connected to the device via the network.

The portable terminal may further include encrypting means for encrypting the setting request. In this case, the setting-request storing means stores the setting request encrypted by the encrypting means.

According to another embodiment of the present invention, there is provided a displaying method of a portable terminal that displays a program guide according to program information for displaying the program guide, or a storage medium storing a program for causing a computer to execute processing for such displaying of a program guide on a portable terminal, the displaying method or program including the steps of, when an instruction for displaying a program guide is received, newly obtaining program information from a providing apparatus that provides the program information if the portable terminal is connected to the providing apparatus via a network; controlling storage of the program information so that the newly obtained program information is stored in program-information storing means for storing program information; and when the instruction for displaying a program guide is received, controlling display of the program guide so that the program guide is displayed according to the program information stored in the program-information storing means.

According to these embodiments of the present invention, when an instruction for displaying a program guide is received, program information is newly obtained from a providing apparatus that provides program information for displaying the program guide if the portable terminal is connected to the providing apparatus via a network, storage of the program information is controlled so that the newly obtained program information is stored in program-information storing means for storing program information, and when the instruction for displaying a program guide is received, display of the program guide is controlled so that the program guide is displayed according to the program information stored in the program-information storing means.

According to these embodiments of the present invention, a program guide can be displayed. Particularly, according to these embodiments of the present invention, a reservation for recording or viewing can be made more easily.

BRIEF DESCRIPTION OF THE DRAWINGS

FIG. 4 is a flowchart of a program-information obtaining process;

DESCRIPTION OF THE PREFERRED EMBODIMENTS

Figure 1:
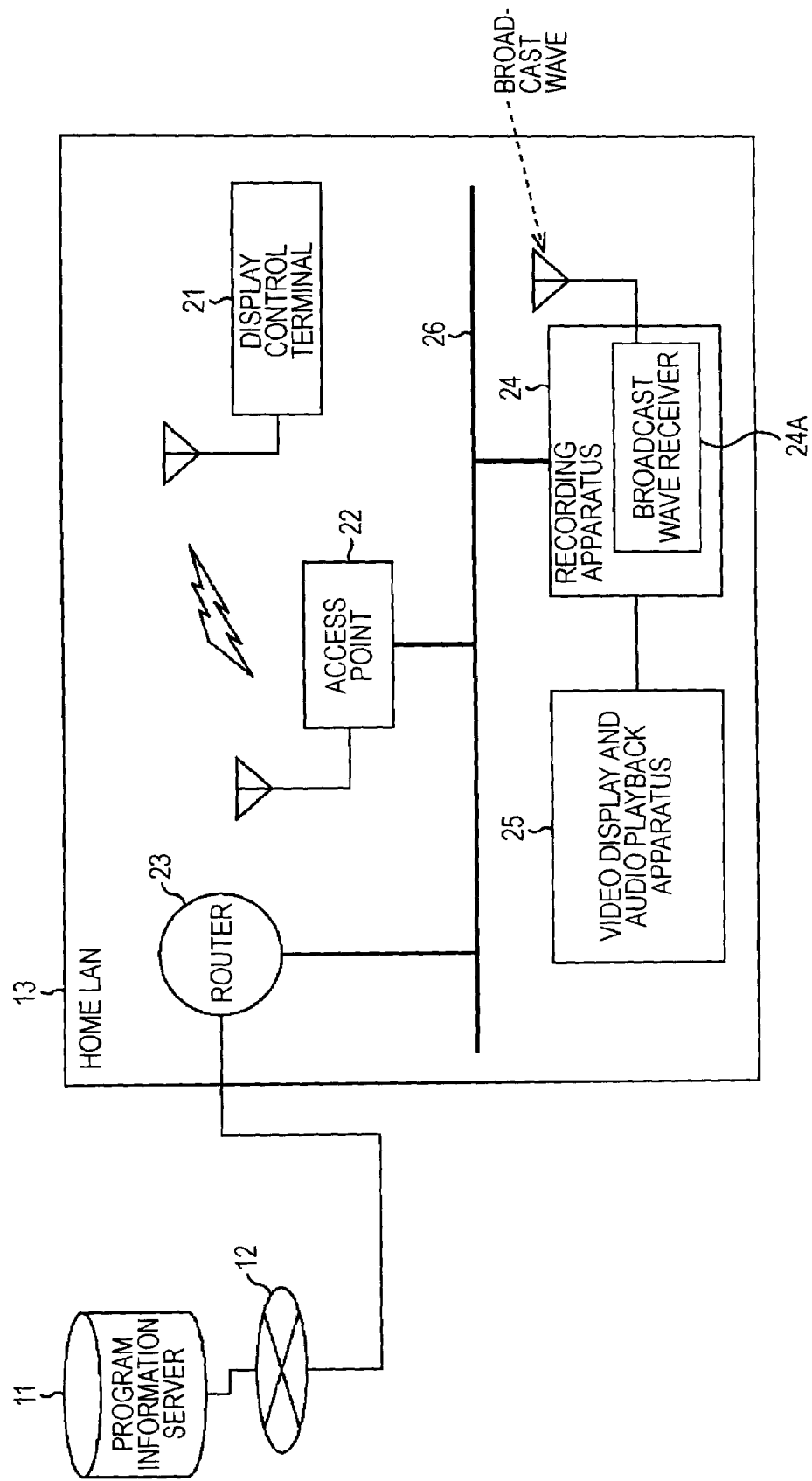
FIG. 1 is a block diagram showing an example configuration of a recording/viewing reservation system according to an embodiment of the present invention.

Before describing embodiments of the present invention, examples of correspondence between the features of the present invention and embodiments described in this specification or shown in the drawings will be described below. This description is intended to assure that embodiments supporting the present invention are described in this specification or shown in the drawings. Thus, even if a certain embodiment is not described in this specification or shown in the drawings as corresponding to certain features of the present invention, that does not necessarily mean that the embodiment does not correspond to those features. Conversely, even if an embodiment is described or shown as corresponding to certain features, that does not necessarily mean that the embodiment does not correspond to other features.

Figure 2:
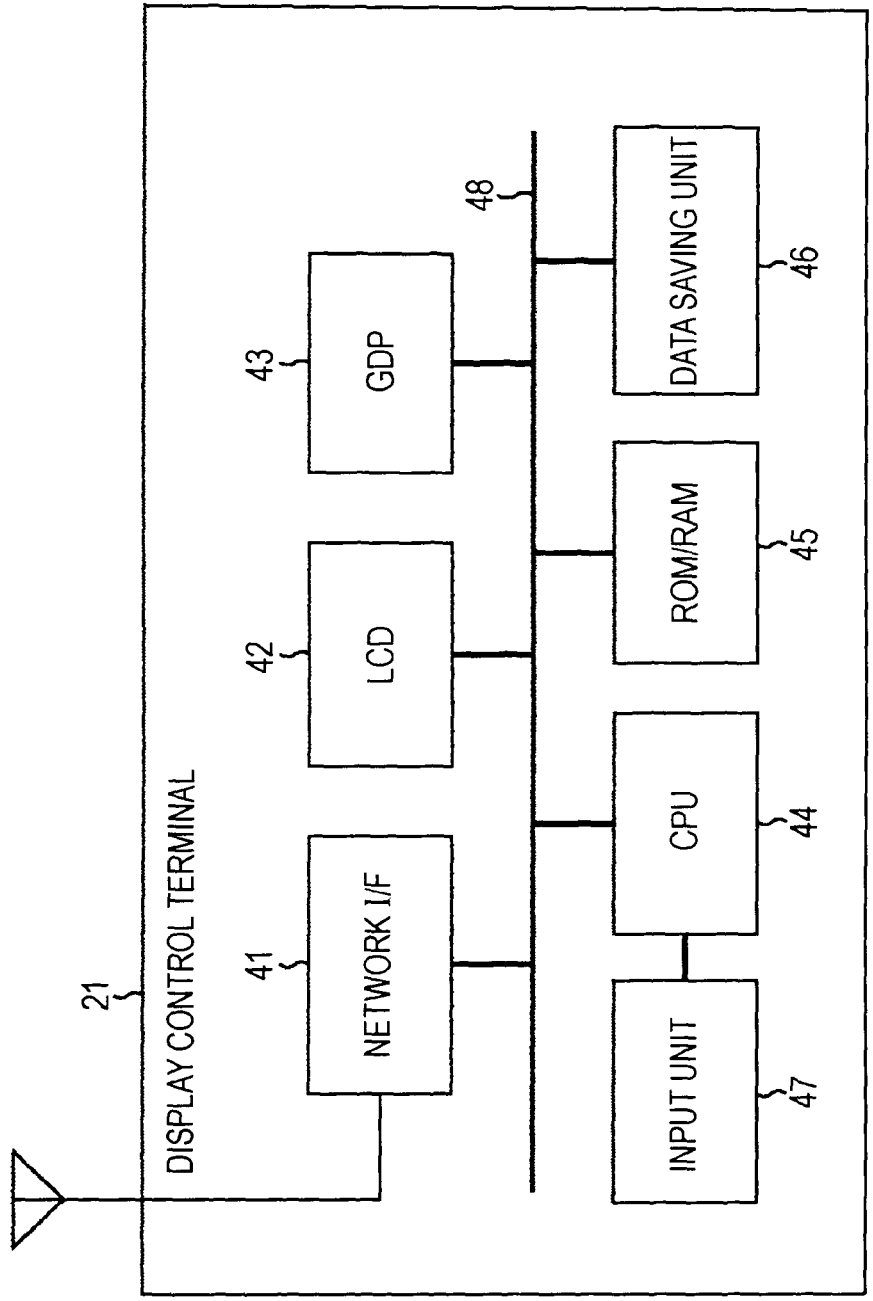
FIG. 2 is a block diagram showing an example internal configuration of a display control terminal.

A portable terminal (e.g., a display control terminal 21 shown in FIG. 3A) according to an embodiment of the present invention includes obtaining means (e.g., a program-information obtaining unit 62 shown in FIG. 3A) for obtaining program information via a network from a providing apparatus (e.g., a program information server 11 shown in FIG. 3B) that provides the program information, the program information being used to display a program guide; program-information storing means (e.g., a program-information storing unit 63 shown in FIG. 3A) for storing the program information obtained; displaying means (e.g., a liquid crystal display (LCD) 42 shown in FIG. 2) for displaying the program guide according to the obtained program information; and display controlling means (e.g., a display control unit 80 shown in FIG. 3A) for controlling display of the program guide so that the program guide is displayed according to the program information stored in the program-information storing means, wherein when an instruction for displaying a program guide is received, the obtaining means newly obtains program information for updating the program information stored in the program-information storing means from the providing apparatus if the portable terminal is connected to the providing apparatus via the network.

The displaying means displays an image (e.g., an off-line icon 165 shown in FIG. 6) indicating that the portable terminal is not connected to the providing apparatus, together with the program guide, if the portable terminal is not connected to the providing apparatus via the network.

Figure 9:
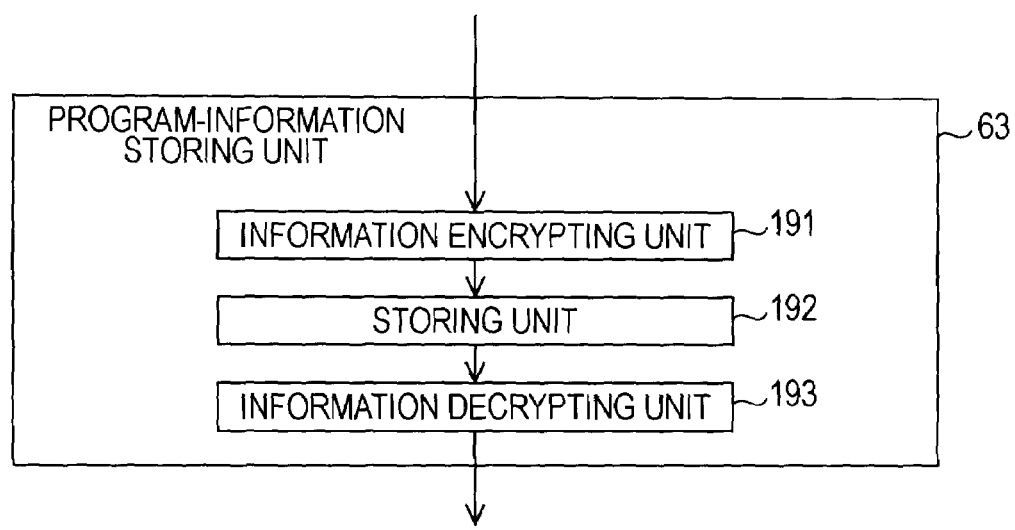
FIG. 9 is a block diagram showing an example configuration of a program-information storing unit.

The portable terminal may further include encrypting means for encrypting the program information (an information encrypting unit 191 shown in FIG. 9). In this case, the program-information storing means (e.g., a storing unit 192 of the program-information storing unit 63, shown in FIG. 9) stores the program information encrypted by the encrypting means.

The portable terminal may further include decrypting means (e.g., an information decrypting unit 193 shown in FIG. 9) for decrypting the encrypted program information stored in the program-information storing means (e.g., the storing unit 192 of the program-information storing unit 63, shown in FIG. 9). In this case, the displaying means displays the program guide according to the program information decrypted by the decrypting means.

Figure 3A:
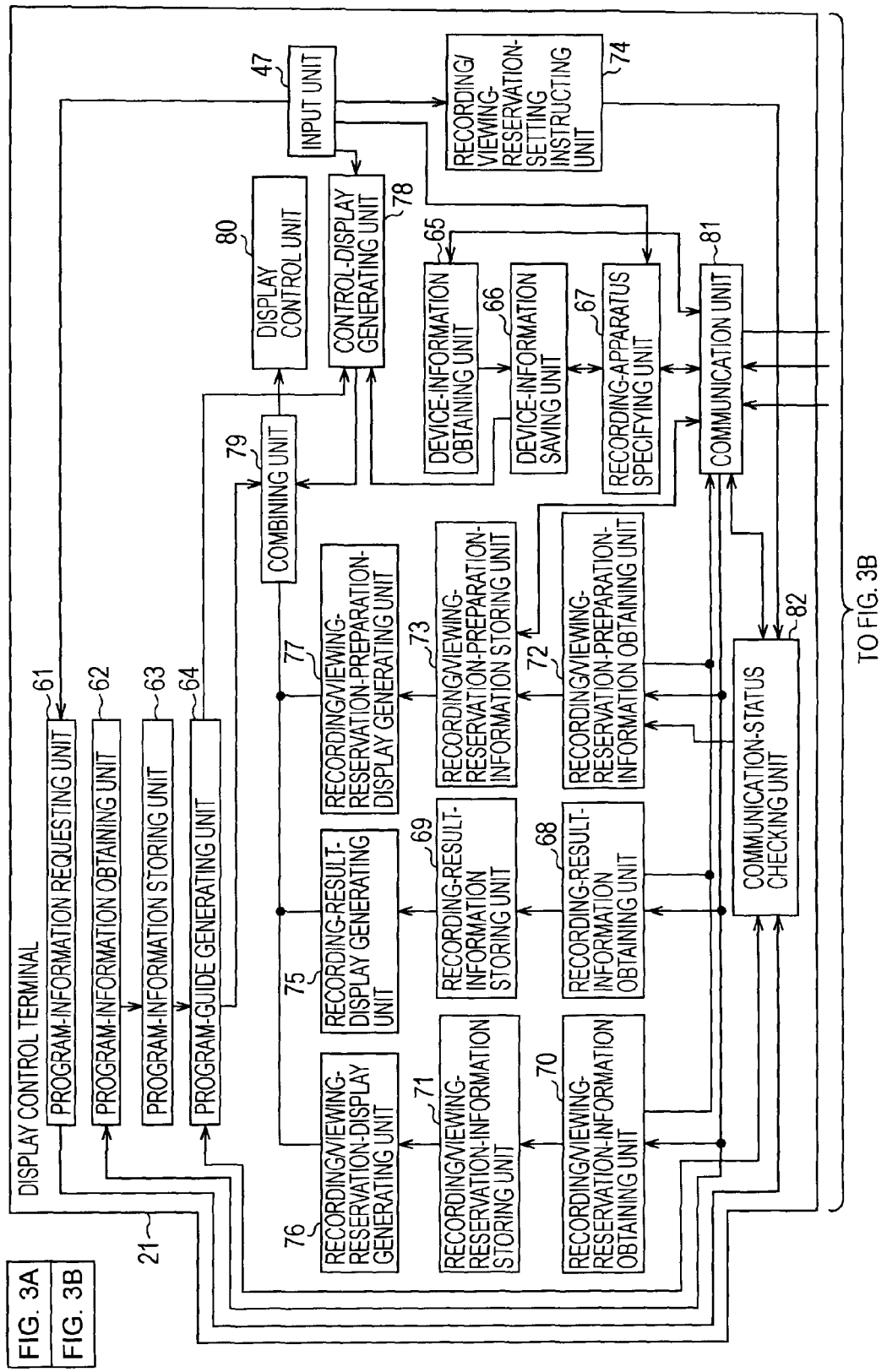
FIGS. 3A and 3B are block diagrams showing example functional configurations of the display control terminal, a recording apparatus, and a program information server.

The portable terminal may further include generating means (e.g., a recording/viewing-reservation-setting instructing unit 74 shown in FIG. 3A) for generating a setting request for requesting reservation for recording or viewing of a specified program to a device (e.g., a recording apparatus 24 shown in FIG. 3B) that is connected to the portable terminal via the network and that records the program or controls display of the program; setting-request storing means (e.g., a recording/viewing-reservation-preparation-information storing unit 73 shown in FIG. 3A) for storing the setting request generated by the generating means if the portable terminal is not connected to the device via the network; and sending means (e.g., a communication unit 81 shown in FIG. 3A) for sending the setting request generated by the generating means if the portable terminal is connected to the device via the network.

Figure 8:
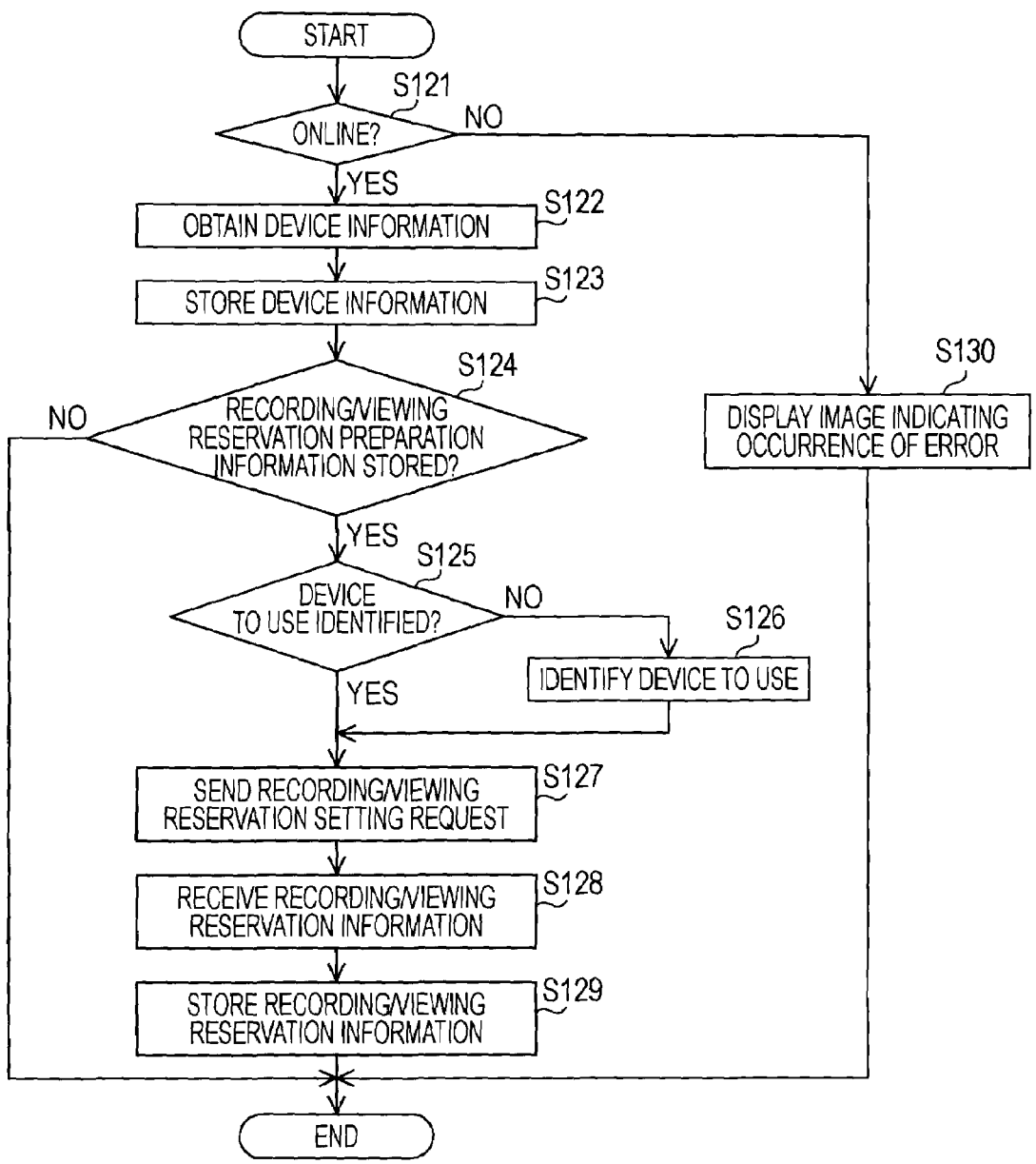
FIG. 8 is a flowchart of a setting-request sending process.

The sending means may send the setting request stored in the setting-request storing means when the portable terminal becomes connected to the device via the network e.g., step S127 shown in FIG. 8).

The portable terminal may further include encrypting means (e.g., an information encrypting unit 201 shown in FIG. 10) for encrypting the setting request. In this case, the setting-request storing means (e.g., a storing unit 202 of the recording/viewing-reservation-preparation-information storing unit 73, shown in FIG. 10) stores the setting request encrypted by the encrypting means.

According to another embodiment of the present invention, there is provided a displaying method of a portable terminal (e.g., the display control terminal 21 shown in FIG. 3A) that displays a program guide according to program information for displaying the program guide, or a storage medium storing a program for causing a computer to execute processing for such displaying of a program on a portable terminal. The displaying method or program includes the steps of, when an instruction for displaying a program guide is received, newly obtaining program information from a providing apparatus (e.g., the program information server 11 shown in FIG. 3B) that provides the program information if the portable terminal is connected to the providing apparatus via a network (e.g., step S44 shown in FIG. 5); controlling storage of the program information so that the newly obtained program information is stored in program-information storing means (e.g., the program-information storing unit 63 shown in FIG. 3A) for storing program information (e.g., step S45 shown in FIG. 5); and when the instruction for displaying a program guide is received, controlling display of the program guide so that the program guide is displayed according to the program information stored in the program-information storing means (e.g., step S54 shown in FIG. 5).

Now, an embodiment of the present invention will be described with reference to the drawings.

FIG. 1 is a block diagram showing an example configuration of a recording/viewing reservation system according to an embodiment of the present invention.

Referring to FIG. 1, the recording/viewing reservation system includes a program information server 11, the Internet 12, and a home local area network (LAN) 13.

The program information server 11 stores program information including information such as program name, broadcast start time and broadcast period, and program genre. The program information server 11 is connected to the Internet 12. For example, upon receiving a request for program information from a device connected to the home LAN 13 via the Internet 12, the program information server 11 sends the stored program information to the device that has issued the request for program information, connected to the home LAN 13 via the Internet 12.

The home LAN 13 is formed, for example, at a home of a user. In the home LAN 13, a display control terminal 21, an access point 22, a router 23, and a recording apparatus 24 are connected to each other in a wired or wireless manner. In the example shown in FIG. 1, the access point 22 to the recording apparatus 24 are connected to each other via a wired LAN 26.

That is, in the example shown in FIG. 1, the display control terminal 21 and the recording apparatus 24 are connected to each other via the home LAN 13.

The display control terminal 21 is a portable terminal, such as a cellular phone or a personal digital assistant (PDA), having a function of a remote commander that remote-controls the recording apparatus 24 or a video display and audio playback apparatus 25, for example, according to user's operations. The display control terminal 21 carries out bilateral communications with and thereby controls the recording apparatus 24 or the like via the access point 22. When the Internet Protocol (IP) is used as a communication protocol, the display control terminal 21 is also referred to as an IP remote commander.

The access point 22 relays data between a wireless LAN and a wired LAN in the home LAN 13. For example, the access point 22 carries out communications with the display control terminal 21 by sending and receiving signals having predetermined frequencies by a communication method called the infrastructure mode, thereby relaying data exchanged between the display control terminal 21 and a device connected to the wired LAN.

In the example shown in FIG. 1, in consideration of convenience of the user who operates the display control terminal 21, for example, in order to allow the user to use the display control terminal 21 anywhere at home, the home LAN 13 is formed so that the display control terminal 21 and the recording apparatus 24 can carry out communications with each other by wireless via the access point 22.

Furthermore, in the example shown in FIG. 1, the display control terminal 21 has a wireless LAN function, and the display control terminal 21 and the access point 22 form a wireless LAN. In this case, the display control terminal 21 carries out communications with the recording apparatus 24 or the like via the access point 22. However, for example, if the recording apparatus 24 that carries out communications with the display control terminal 21 has a wireless LAN function and the display control terminal 21 and the recording apparatus 24 support the ad-hoc communication mode, the display control terminal 21 and the recording apparatus 24 can carry out wireless communications in the ad-hoc communication mode without the access point 22.

The router 23 is connected to the Internet 12, and relays packets exchanged by devices on the Internet 12 or devices on the home LAN 13.

The recording apparatus 24 is, for example, a video tape recorder, a digital versatile disc (DVD) recorder, a hard disk recorder, or the like. The recording apparatus 24 includes a broadcast wave receiver 24A that receives broadcast waves of television broadcasting or the like via an antenna. According to a user's instruction, the recording apparatus 24 records a program of television broadcasting or the like received by the broadcast wave receiver 24A, on a recording medium such as a video tape, a DVD, or a hard disk.

Furthermore, the recording apparatus 24 plays back the recorded program. Furthermore, the recording apparatus 24 supplies video and audio signals corresponding to the program played back or the program received by the broadcast wave receiver 24A to the video display and audio playback apparatus 25.

The video display and audio playback apparatus 25 is, for example, a television receiver or the like. The video display and audio playback apparatus 25 displays images and outputs sounds of the program corresponding to the signals supplied from the recording apparatus 24.

FIG. 2 is a block diagram showing an example internal configuration of the display control terminal 21 shown in FIG. 1.

Referring to FIG. 2, the display control terminal 21 includes a network interface (I/F) 41, a liquid crystal display (LCD) 42, a graphic display processor (GDP) 43, a central processing unit (CPU) 44, a read-only memory (ROM)/random access memory (RAM) 45, a data saving unit 46, an input unit 47, and a bus 48. The network I/F 41 to the data saving unit 46 are connected to each other via the bus 48, and the input unit 47 is connected to the CPU 44.

The network I/F 41 is a wireless LAN adapter or the like, and carries out communications, for example, with the access point 22. More specifically, the network I/F 41 sends data supplied via the bus 48 to the access point 22, and receives data sent from the access point 22 and outputs the data onto the bus 48.

The LCD 42 displays various types of information, such as image or text. The GDP 43 executes image processing for displaying image or text, such as processing for generating display data for displaying an image on the LCD 42, under the control of the CPU 44. The CPU 44 executes a program stored in the ROM/RAM 45 to execute various types of processing, for example, according to user's instructions input via the input unit 47.

The ROM/RAM 45 stores a program executed by the CPU 44, etc. Furthermore, the ROM/RAM 45 stores data used for the operation of the CPU 44. The data saving unit 46 is, for example, a non-volatile storage device that can save stored information even when power is turned off, such as a hard disk or a flash memory. The data saving unit 46 saves information regarding reservation for recording or reservation for viewing, program information, and so forth. The input unit 47 includes, for example, buttons, a dial, or the like. The input unit 47 is operated by the user to use a graphical user interface (GUI) displayed on the LCD 42.

Figure 3B:
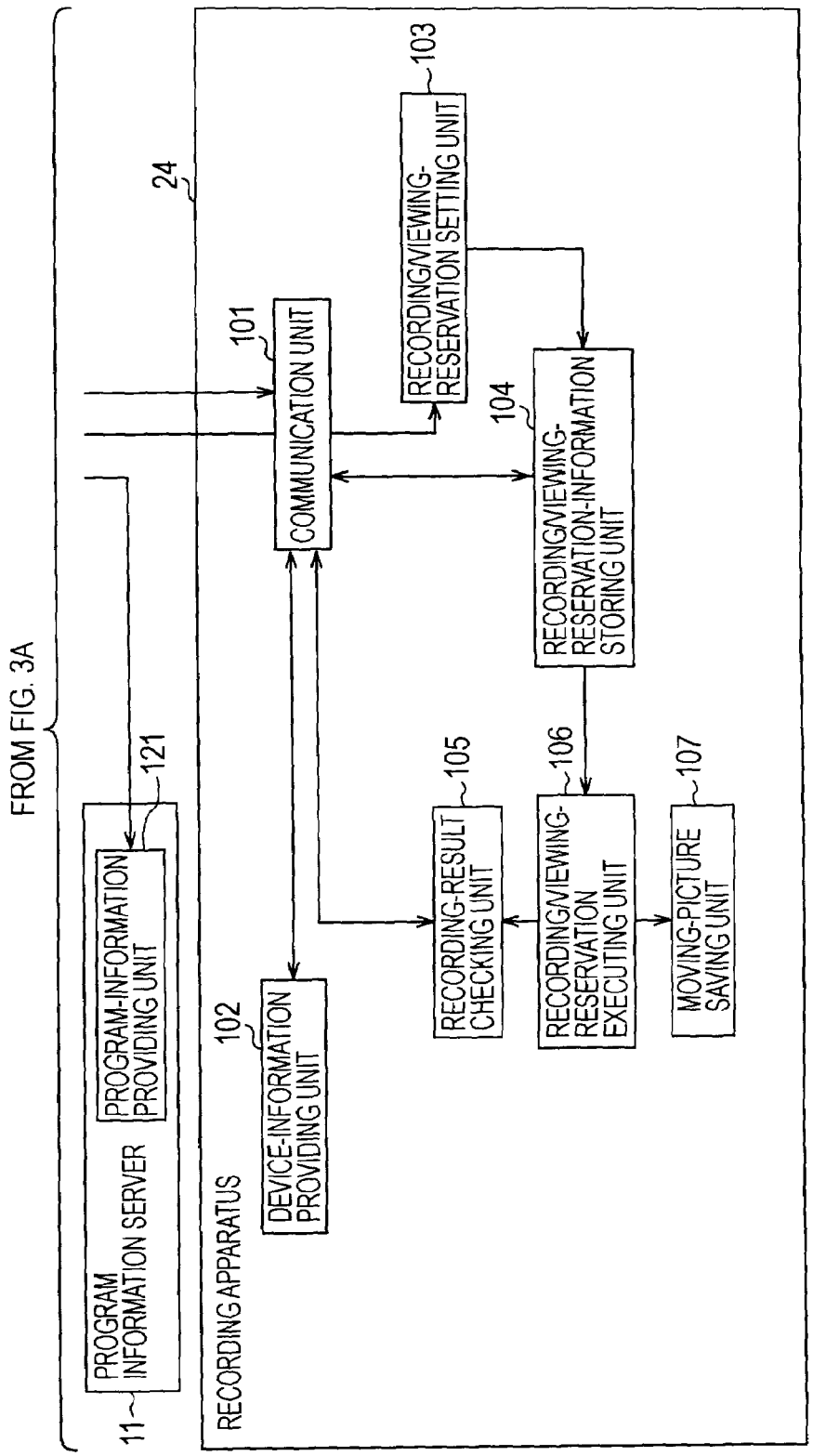

FIGS. 3A and 3B are block diagrams showing example functional configurations of the display control terminal 21, the recording apparatus 24, and the program information server 11 shown in FIG. 1.

The display control terminal 21 includes the input unit 47, a program-information requesting unit 61, a program-information obtaining unit 62, a program-information storing unit 63, a program-guide generating unit 64, a device-information obtaining unit 65, a device-information saving unit 66, a recording-apparatus specifying unit 67, a recording-result-information obtaining unit 68, a recording-result-information storing unit 69, a recording/viewing-reservation-information obtaining unit 70, a recording/viewing-reservation-information storing unit 71, a recording/viewing-reservation-preparation-information obtaining unit 72, a recording/viewing-reservation-preparation-information storing unit 73, a recording/viewing-reservation-setting instructing unit 74, a recording-result-display generating unit 75, a recording/viewing-reservation-display generating unit 76, a recording/viewing-reservation-preparation-display generating unit 77, a control-display generating unit 78, a combining unit 79, a display control unit 80, a communication unit 81, and a communication-status checking unit 82. These functions of the display control terminal 21 are realized by execution of a program by the CPU 44 shown in FIG. 2.

The recording apparatus 24 includes a communication unit 101, a device-information providing unit 102, a recording/viewing-reservation setting unit 103, a recording/viewing-reservation-information storing unit 104, a recording-result checking unit 105, a recording/viewing-reservation executing unit 106, and a moving-picture saving unit 107.

The program information server 11 includes a program-information providing unit 121.

In the display control terminal 21, the program-information requesting unit 61 sends a request for obtaining program information to the program-information providing unit 121 of the program information server 11 via the communication-status checking unit 82, the communication unit 81, and the network formed by the home LAN 13 and the Internet 12, for example, at predetermined intervals.

In response to the request for obtaining program information, sent from the program-information requesting unit 61, the program information server 11 sends latest program information to the program-information obtaining unit 62 via the communication unit 81.

The program-information obtaining unit 62 obtains the latest program information via the communication unit 81 and supplies the program information to the program-information storing unit 63. For example, the program-information storing unit 63 is a predetermined storage area of the data saving unit 46 in which program information is stored under the control of the CPU 44. The program-information storing unit 63 stores the program information supplied from the program-information obtaining unit 62.

The function of the program-guide generating unit 64 is realized, for example, by the GDP 43, shown in FIG. 2, executing processing for generating display data of a program guide under the control of the CPU 44. The program-guide generating unit 64 reads program information from the program-information storing unit 63, for example, according to a user's instruction for displaying a program guide, generates display data of a program guide according to the program information, and supplies the display data to the combining unit 79.

The device-information obtaining unit 65 obtains device information from the recording apparatus 24 or other recording apparatuses that can carry out communications with the display control terminal 21. More specifically, for example, the device-information obtaining unit 65 receives device information identifying the recording apparatus 24 via the communication unit 81, sent from the device-information providing unit 102 of the recording apparatus 24, and supplies the device information to the device-information saving unit 66. The device-information saving unit 66 stores the device information supplied from the device-information obtaining unit 65.

The recording-apparatus specifying unit 67 reads device information identifying an apparatus to which the communication unit 81 should send data, commands, or the like, from the device information saved in the device-information saving unit 66, and supplies the device information to the communication unit 81 to specify an apparatus relevant to processing. The communication unit 81 sends data or the like to the apparatus specified by the device information supplied from the recording-apparatus specifying unit 67.

The recording-result-information obtaining unit 68 sends a request for obtaining recording-result information indicating whether recording of a program has succeeded, for example, to the recording apparatus 24 via the communication unit 81, and obtains the recording-result information sent from the recording apparatus 24 in response to the obtaining request via the communication unit 81. That is, the recording-result-information obtaining unit 68 supplies a request for obtaining recording-result information to the communication unit 81. Then, the communication unit 81 sends the obtaining request supplied from the recording-result-information obtaining unit 68 to the recording apparatus 24 specified by the device information supplied from the recording-apparatus specifying unit 67. Furthermore, the communication unit 81 receives the recording-result information sent from the recording apparatus 24 in response to the obtaining request, and supplies the recording-result information to the recording-result-information obtaining unit 68. The recording-result-information obtaining unit 68 obtains the recording-result information supplied from the communication unit 81 in this manner, and supplies the recording-result information to the recording-result-information storing unit 69.

The recording-result-information storing unit 69 is, for example, a predetermined storage area of the data saving unit 46 where recording-result information is stored under the control of the CPU 44. The recording-result-information storing unit 69 stores the recording-result information supplied from the recording-result-information obtaining unit 68.

The recording/viewing-reservation-information obtaining unit 70 sends a request for obtaining reservation information to the recording apparatus 24 via the communication unit 81. The reservation information is information indicating a program for which recording or viewing has been reserved according to a user's instruction. Then, the recording/viewing-reservation-information obtaining unit 70 obtains the recording/viewing reservation information sent from the recording apparatus 24 via the communication unit 81. That is, the recording/viewing-reservation-information obtaining unit 70 supplies a request for obtaining recording/viewing reservation information to the communication unit 81. Then, the communication unit 81 sends the obtaining request supplied from the recording/viewing-reservation-information obtaining unit 70 to the recording apparatus 24 identified by the device information supplied from the recording-apparatus specifying unit 67. Furthermore, the communication unit 81 receives the recording/viewing reservation information sent from the recording apparatus 24 in response to the obtaining request, and supplies the recording/viewing reservation information to the recording/viewing-reservation-information obtaining unit 70. The recording/viewing-reservation-information obtaining unit 70 receives the recording/viewing reservation information supplied from the communication unit 81, and supplies the recording/viewing reservation information to the recording/viewing-reservation-information storing unit 71.

The recording/viewing-reservation-information storing unit 71 is, for example, a predetermined storage area of the data saving unit 46 where reservation information is stored under the control of the CPU 44. The recording/viewing-reservation-information storing unit 71 stores the recording/viewing reservation information supplied from the recording/viewing-reservation-information obtaining unit 70.

The recording/viewing-reservation-preparation-information obtaining unit 72 obtains reservation preparation information from the communication-status checking unit 82. For example, the reservation preparation information includes a recording/viewing reservation setting request that has been generated by the recording/viewing-reservation-setting instructing unit 74 but has not yet been sent to the recording apparatus 24 due to a failure of the display control terminal 21 to carry out communications with the recording apparatus 24. Furthermore, as needed, the reservation preparation may also include device information identifying the recording apparatus 24 to which the reservation setting request as reservation preparation information is to be sent. The recording/viewing-reservation-preparation-information obtaining unit 72 supplies the reservation preparation information to the recording/viewing-reservation-preparation-information storing unit 73.

The recording/viewing-reservation-preparation-information storing unit 73 is, for example, a predetermined storage area of the data saving unit 46 where reservation preparation information is stored under the control of the CPU 44. The recording/viewing-reservation-preparation-information storing unit 73 stores the recording/viewing reservation preparation information supplied from the recording/viewing-reservation-preparation-information obtaining unit 72.

The recording/viewing-reservation-setting instructing unit 74 sends a recording/viewing reservation setting request to the recording apparatus 24 via the communication-status checking unit 82 and the communication unit 81, according to an operation signal supplied from the input unit 47 in response to a user's operation of the input unit 47. More specifically, the recording/viewing-reservation-setting instructing unit 74 supplies a recording/viewing reservation setting request to the communication unit 81 via the communication-status checking unit 82. Then, the communication unit 81 sends the recording/viewing-reservation setting request supplied from the recording/viewing-reservation-setting instructing unit 74 to the recording apparatus 24 identified by the device information supplied from the recording-apparatus specifying unit 67.

The function of recording-result-display generating unit 75 is realized, for example, by the GDP 43, shown in FIG. 2, executing processing for generating display data of an image indicating completion of recording under the control of the CPU 44. The recording-result-display generating unit 75 reads recording-result information stored in the recording-result-information storing unit 69, generates display data of an image indicating completion of recording, and supplies the display data to the combining unit 79. For example, the image indicating completion of recording is attached to an area of a program guide corresponding to a recorded program.

The function of the recording/viewing-reservation-display generating unit 76 is realized, for example, by the GDP 43, shown in FIG. 2, executing processing for generating display data of an image indicating a reservation for recording or viewing under the control of the CPU 44. The recording/viewing-reservation-display generating unit 76 reads recording/viewing reservation information stored in the recording/viewing-reservation-information storing unit 71, generates display data of an image indicating a reservation for recording or viewing, and supplies the display data to the combining unit 79. For example, the image indicating a reservation for recording or viewing is attached to an area of a program guide corresponding to a program for which a reservation for recording or viewing has been made.

The function of the recording/viewing-reservation-preparation-display generating unit 77 is realized, for example, by the GDP 43, shown in FIG. 2, executing processing for generating display data of an image indicating preparation of a reservation for recording or viewing under the control of the CPU 44. The recording/viewing-reservation-preparation-display generating unit 77 reads recording/viewing reservation preparation information stored in the recording/viewing-reservation-preparation-information storing unit 73, generates display data of an image indicating preparation of a reservation for recording or viewing, and supplies the display data to the combining unit 79. For example, the image indicating preparation of a reservation for recording or viewing is attached to an area of a program guide corresponding to a program for which preparation of a reservation for recording or viewing has been made, i.e., a program for which a reservation for recording or viewing is going to be made.

The function of the control-display generating unit 78 is realized, for example, by the GDP 43, shown in FIG. 2, executing processing for generating display data under the control of the CPU 44. According to an operation signal supplied from the input unit 47, the control-display generating unit 78 generates display data for highlighting a program displayed in a certain area of a program guide, i.e., display data for focusing on information representing a program, and supplies the display data to the combining unit 79.

More specifically, according to an operation signal supplied from the input unit 47, the control-display generating unit 78 generates display data for dehighlighting a currently highlighted program and newly highlighting another program, and supplies the display data to the combining unit 79. Thus, the highlighted program is changed according to a user's operation of the input unit 47. Furthermore, the control-display generating unit 78 generates display data of an image indicating that the display control terminal 21 is not connected to the recording apparatus 24, i.e., display data of an image indicating that the display control terminal 21 is off line, and supplies the display data to the combining unit 79.

The function of the combining unit 79 is realized, for example, by the GDP 43, shown in FIG. 2, executing processing for combining display data under the control of the CPU 44. The combining unit 79 combines the display data of the program guide, supplied from the program-guide generating unit 64, the display data of the recording result information, supplied from the recording-result-display generating unit 75, the display data of the recording/viewing reservation information, supplied from the recording/viewing-reservation-display generating unit 76, the display data of the recording/viewing reservation preparation information, supplied from the recording/viewing-reservation-preparation-display generating unit 77, and the display data supplied from the control-display generating unit 78, thereby generating display data of a complete program guide. Then, the combining unit 79 supplies the display data of the complete program guide to the display control unit 80.

The display control unit 80 displays the program guide on the LCD 42 shown in FIG. 2, according to the display data of the program guide supplied from the combining unit 79.

The function of the communication unit 81 is realized, for example, by the network I/F 41, shown in FIG. 2, carrying out communications with other devices under the control of the CPU 44. The communication unit 81 carries out communications with the program information server 11 or the recording apparatus 24 in response to requests from the communication-status checking unit 82, the recording-result-information obtaining unit 68, the recording/viewing-reservation-information obtaining unit 70, or the like. The communication-status checking unit 82 determines whether the display control terminal 21 is connected to a network, such as the home LAN 13 or the Internet 12. More specifically, the communication-status checking unit 82 determines whether the display control terminal 21 is connected to the recording apparatus 24 or the program information server 11 via a network to check the communication status of the display control terminal 21.

Next, the recording apparatus 24 will be described. The communication unit 101 carries out communications with the display control terminal 21, for example, with the communication unit 81 thereof.

The device-information providing unit 102 sends device information identifying the recording apparatus 24 in response to a device-information obtaining request from the display control terminal 21. More specifically, upon receiving a device-information obtaining request sent from the display control terminal 21, the communication unit 101 supplies the device-information obtaining request to the device-information providing unit 102. The device-information providing unit 102 has stored therein device information identifying the recording apparatus 24. Upon receiving the device-information obtaining request from the communication unit 101, the device-information providing unit 102 supplies the device information identifying the recording apparatus 24 to the communication unit 101. The communication unit 101 sends the device information supplied from the device-information providing unit 102 to the display control terminal 21.

The recording/viewing-reservation setting unit 103 supplies recording/viewing reservation information to the recording/viewing-reservation-information storing unit 104 according to a recording/viewing-reservation setting request from the display control terminal 21. More specifically, upon receiving a recording/viewing-reservation setting request from the display control terminal 21, the communication unit 101 supplies the setting request to the recording/viewing-reservation setting unit 103. The recording/viewing-reservation setting unit 103 generates recording/viewing reservation information according to the recording/viewing-reservation setting request supplied from the communication unit 101, and supplies the recording/viewing reservation information to the recording/viewing-reservation-information storing unit 104.

The recording/viewing-reservation-information storing unit 104 stores the recording/viewing reservation information supplied from the recording/viewing-reservation setting unit 103.

Furthermore, the recording/viewing-reservation-information storing unit 104 sends recording/viewing reservation information to the display control terminal 21 according to a recording/viewing-reservation-information obtaining request from the display control terminal 21. More specifically, upon receiving a recording/viewing-reservation-information obtaining request from the display control terminal 21, the communication unit 101 supplies the obtaining request to the recording/viewing-reservation-information storing unit 104. The recording/viewing-reservation-information storing unit 104 has stored therein recording/viewing reservation information. Upon receiving a recording/viewing-reservation-information obtaining request from the communication unit 101, the recording/viewing-reservation-information storing unit 104 supplies the recording/viewing reservation information to the communication unit 101. The communication unit 101 sends the recording/viewing reservation information supplied from the recording/viewing-reservation-information storing unit 104 to the display control terminal 21.

The recording-result checking unit 105 checks a result of recording executed by the recording/viewing-reservation executing unit 106, in response to a recording-result-information obtaining request from the display control terminal 21. Then, the recording-result checking unit 105 supplies the resulting recording result information to the display control terminal 21. More specifically, upon receiving a recording-result-information obtaining request from the display control terminal 21, the communication unit 101 supplies the obtaining request to the recording-result checking unit 105. The recording-result checking unit 105 checks whether recording executed by the recording/viewing-reservation executing unit 106 has succeeded or failed on the basis of the recording-result-information obtaining request supplied from the communication unit 101, and supplies recording result information indicating the result of checking to the communication unit 101. The communication unit 101 sends the recording result information supplied from the recording-result checking unit 105 to the display control terminal 21.

The recording/viewing-reservation executing unit 106 executes a reservation for recording or viewing according to the recording/viewing reservation information stored in the recording/viewing-reservation-information storing unit 104. More specifically, the recording/viewing-reservation executing unit 106 supplies video or audio signals of a program received by the broadcast wave receiver 24A to the moving-picture saving unit 107 according to recording reservation information, thereby recording the program. Furthermore, the recording/viewing-reservation executing unit 106 supplies video and audio signals of a program received by the broadcast wave receiver 24A to the video display and audio playback apparatus 25 connected to the recording apparatus 24, according to viewing reservation information.

Furthermore, when the user has performed an operation for instructing recording, the recording/viewing-reservation executing unit 106 records a program in the moving-picture saving unit 107 according to the instruction.

The moving-picture saving unit 107 stores the video and audio signals supplied from the recording/viewing-reservation executing unit 106.

The program-information providing unit 121 of the program information server 11 receives a program-information obtaining request from the display control terminal 21 or the like, and sends program information to the display control terminal 21 or the like according to the program-information obtaining request, thereby providing program information to another device connected to a network, such as the Internet 12 or the home LAN 13.

The display control terminal 21 accesses the program information server 11 via the network including the home LAN 13 and the Internet 12 at predetermined intervals to execute a program-information obtaining process for obtaining latest program information. Furthermore, the display control terminal 21 also executes the program-information obtaining process when the display control terminal 21 is activated or when an instruction for obtaining program information is issued by the user.

Now, the program-information obtaining process executed by the display control terminal 21 will be described with reference to a flowchart shown in FIG. 4.

In step S11, the program-information requesting unit 61 generates a program-information obtaining request for requesting sending of program information, and supplies the obtaining request to the communication-status checking unit 82.

In step S12, the communication-status checking unit 82 checks whether the display control terminal 21 is on line, i.e., whether the display control terminal 21 is connected to the Internet 12 via the access point 22 and the router 23.

If it is determined in step S12 that the display control terminal 21 is not on line, i.e., that the display control terminal 21 is off line, it is not possible to obtain program information from the program information server 11, so that the program-information obtaining process is exited.

On the other hand, if it is determined in step S12 that the display control terminal 21 is on line, in step S13, the communication-status checking unit 82 sends the program-information obtaining request supplied from the program-information requesting unit 61 to the program information server 11 via the communication unit 81.

More specifically, the communication-status checking unit 82 supplies the program-information obtaining request to the communication unit 81, and the communication unit 81 sends the program-information obtaining request supplied from the communication-status checking unit 82 to the program-information providing unit 121 of the program information server 11.

Upon receiving the program-information obtaining request, the program-information providing unit 121 of the program information server 11 sends program information to the display control terminal 21. In step S14, the program-information obtaining unit 62 obtains the program information sent from the program information server 11.

More specifically, the communication unit 81 receives the program information sent from the program-information providing unit 121, and the program-information obtaining unit 62 obtains the program information from the communication unit 81. Then, the program-information obtaining unit 62 supplies the program information to the program-information storing unit 63.

In step S15, the program-information storing unit 63 stores the program information supplied from the program-information obtaining unit 62. This concludes the program-information obtaining process. That is, the program-information storing unit 63 updates program information stored therein with the program information supplied from the program-information obtaining unit 62.

In this manner, the display control terminal 21 obtains the latest program information from the program information server 11 and stores the program information. Since the program-information storing unit 63 of the display control terminal 21, i.e., the data saving unit 46, is a non-volatile storage device, the program information stored in the program-information storing unit 63 is maintained even when power is turned off. Thus, the user operating the display control terminal 21 can view a displayed program guide based on the program information even when the display control terminal 21 is off line.

Although this embodiment is described in the context of an example where the display control terminal 21 obtains program information from the program information server 11 connected via a network, alternatively, the display control terminal 21 may receive television broadcast waves and obtain program information from the received television broadcast waves, or the display control terminal 21 may obtain program information from the recording apparatus 24.

The display control terminal 21 executes a program-guide displaying process for displaying a program guide when an instruction for displaying a program guide is issued by the user.

Now, the program-guide displaying process executed by the display control terminal 21 will be described with reference to a flowchart shown in FIG. 5. The program-guide displaying process is started when the user has operated the input unit 47 to instruct displaying of a program guide and an operation signal corresponding to the user's operation has been supplied from the input unit 47 to the program-information requesting unit 61.

In step S41, the program-information requesting unit 61 generates a program-information obtaining request according to the operation signal input from the input unit 47, and supplies the obtaining request to the communication-status checking unit 82.

In step S42, the communication-status checking unit 82 checks whether the display control terminal 21 is on line, i.e., whether the display control terminal 21 is connected to the Internet 12 via the access point 22 and the router 23. More specifically, the communication-status checking unit 82 checks whether the display control terminal 21 is connected to the program information server 11 via the Internet 12, and determines that the display control terminal 21 is on line if the display control terminal 21 is connected to the program information server 11 and is ready to obtain program information.

If it is determined in step S42 that the display control terminal 21 is on line, in step S43, the communication-status checking unit 82 sends the program-information obtaining request supplied from the program-information requesting unit 61 to the program information server 11 via the communication unit 81.

Upon receiving the program-information obtaining request, the program-information providing unit 121 of the program information server 11 sends program information to the display control terminal 21. In step S44, the program-information obtaining unit 62 obtains the program information sent from the program information server 11.

More specifically, the communication unit 81 receives the program information sent from the program-information providing unit 121, and the program-information obtaining unit 62 obtains the program information from the communication unit 81. Then, the program-information obtaining unit 62 supplies the program information to the program-information storing unit 63.

In step S45, the program-information storing unit 63 stores the program information supplied from the program-information obtaining unit 62. Then, the process proceeds to step S48. That is, the program-information storing unit 63 updates program information stored therein with the program information supplied from the program-information obtaining unit 62.

If it is determined in step S42 that the display control terminal 21 is not on line, i.e., that the display control terminal 21 is off line, since the display control terminal 21 is not connected to the program information server 11 so that it is not possible to obtain program information, the communication-status checking unit 82 instructs the program-guide generating unit 64 to generate display data of a program guide. Then, the process proceeds to step S46.

Even when it is determined in step S42 that the display control terminal 21 is on line, if the latest program information is already stored in the program-information storing unit 63, i.e., if program information that is the same as program information that is to be obtained from the program information server 11 is already stored, the process may proceed from step S42 to step S46 without obtaining program information.

In this case, for example, the communication-status checking unit 82 obtains information indicating the updating time of program information from the program information server 11, and the display control terminal 21 does not obtain program information if the updating time indicated by the obtained information coincides with the updating time of the program information stored in the program-information storing unit 63.

In step S46, the program-guide generating unit 64 checks whether program information previously obtained is stored in the program-information storing unit 63.

If it is determined in step S46 that program information is stored, the program-guide generating unit 64 instructs the control-display generating unit 78 to generate display data of an image indicating that a connection with the program information server 11 is not formed, i.e., display data of an image indicating that the display of the program guide is off-line display. Then, the process proceeds to step S47.

In step S47, according to the instruction from the program-guide generating unit 64, the control-display generating unit 78 generates display data for displaying an image, such as an icon, indicating off-line display, and supplies the display data to the combining unit 79.

When display data has been generated in step S47 or newly obtained program information has been stored in step S45, in step S48, the program-guide generating unit 64 reads program information last obtained by the program-information obtaining unit 62, i.e., the program information stored in the program-information storing unit 63, generates display data of a program guide according to the program information, and supplies the display data to the combining unit 79.

In step S49, the control-display generating unit 78 generates display data for highlighting a program displayed in a certain area of a program guide, e.g., display data for displaying a cursor for focusing on information representing a program displayed in a certain area, and supplies the display data to the combining unit 79.

In step S50, the recording/viewing-reservation-display generating unit 76 reads the recording/viewing reservation information stored in the recording/viewing-reservation-information storing unit 71, generates display data of an image, such as an icon, indicating a reservation for recording or viewing, and supplies the display data to the combining unit 79.

In step S51, the recording-result-display generating unit 75 reads the recording result information stored in the recording-result-information storing unit 69, generates display data of an image, such as an icon, indicating a recording result, e.g., display data of an image indicating completion of recording, and supplies the display data to the combining unit 79.

In step S52, the recording/viewing-reservation-preparation-display generating unit 77 reads the recording/viewing reservation preparation information stored in the recording/viewing-reservation-preparation-information storing unit 73, generates display data of an image, such as an icon, indicating preparation of a reservation for recording or viewing, and supplies the display data to the combining unit 79.

In step S53, the combining unit 79 combines the display data supplied individually from the program-guide generating unit 64, the recording-result-display generating unit 75, the recording/viewing-reservation-display generating unit 76, the recording/viewing-reservation-preparation-display generating unit 77, and the control-display generating unit 78, thereby generating display data of a complete program guide. That is, the combining unit 79 combines the display data generated in step S47 and steps S48 to S52. Then, the combining unit 79 supplies the resulting display data of a complete program guide to the display control unit 80.

In step S54, the display control unit 80 supplies the display data supplied from the combining unit 79 to the LCD 42 so that the program guide is displayed on the LCD 42. That is, the display control unit 80 exercises control so that a program guide is displayed according to program information newly obtained from the program information server 11 when the display control terminal 21 is on line and so that a program guide is displayed according to program information already obtained from the program information server 11 and stored in the program-information storing unit 63 when the display control terminal 21 is off line.

The LCD 42 displays a program guide according to the display data supplied from the display control unit 80. This concludes the program-guide displaying process.

If it is determined in step S46 that program information is not stored, it is not possible to display a program guide. Thus, the program-guide generating unit 64 instructs the control-display generating unit 78 to generate display data of an image indicating occurrence of an error. Then, the process proceeds to step S55.

In step S55, the display control unit 80 causes the LCD 42 to display the image indicating occurrence of an error. Then, the program-guide displaying process is then exited. More specifically, the control-display generating unit 78 generates display data of an image indicating occurrence of an error according to an instruction from the program-guide generating unit 64, e.g., display data of an image including a message saying "Display of a program guide failed." or the like, and supplies the display data to the display control unit 80 via the combining unit 79. The display control unit 80 supplies the display data supplied from the control-display generating unit 78 to the LCD 42 so that a corresponding image is displayed on the LCD 42.

As described above, when the display control terminal 21 is on line, i.e., when the display control terminal 21 is connected to the program information server 11 via a network, such as the Internet 12, the display control terminal 21 obtains the latest program information from the program information server 11 and displays a program guide on line according to the obtained program information. On the other hand, when the display control terminal 21 is off line, i.e., when the display control terminal 21 is not connected to the program information server 11, the display control terminal 21 displays a program guide off line according to program information that has already been obtained and stored.

As described above, the latest program information is obtained and a program guide is displayed on line when the display control terminal 21 is on line, while a program guide is displayed off line according to stored program information when the display control terminal 21 is off line. Accordingly, it is possible to display the latest program guide when the display control terminal 21 is on line and to display a program guide based on program information that has already been obtained and stored, although not necessarily the latest, when the display control terminal 21 is off line.

Thus, the user can check a displayed program guide regardless of whether the display control terminal 21 is off line or on line, i.e., regardless of the environment in which the display control terminal 21 is used. Therefore, the user can readily make a reservation for recording or viewing of a program.

Through the program-guide displaying process described above, for example, a program guide shown in FIG. 6 is displayed on the LCD 42 of the display control terminal 21.

On the LCD 42, in an upper right part of a display area, time information 151 indicating a current time and calendar information 142 indicating a current date are displayed.

Furthermore, in a middle part of the display area of the LCD 42, a program guide 153 is displayed. In the program guide 153, time is represented along the vertical axis, and channels (broadcasting stations) are arranged along the horizontal direction. The program guide 153 is divided into areas of programs identified by broadcasting periods and broadcasting stations, and each of the areas include information representing the title, start time, and so forth of the corresponding program. Furthermore, each of the areas of the program guide 153 includes a recording result icon 161, a recording reservation preparation icon 162, a viewing reservation icon 163, and so forth as needed.

Figure 6:
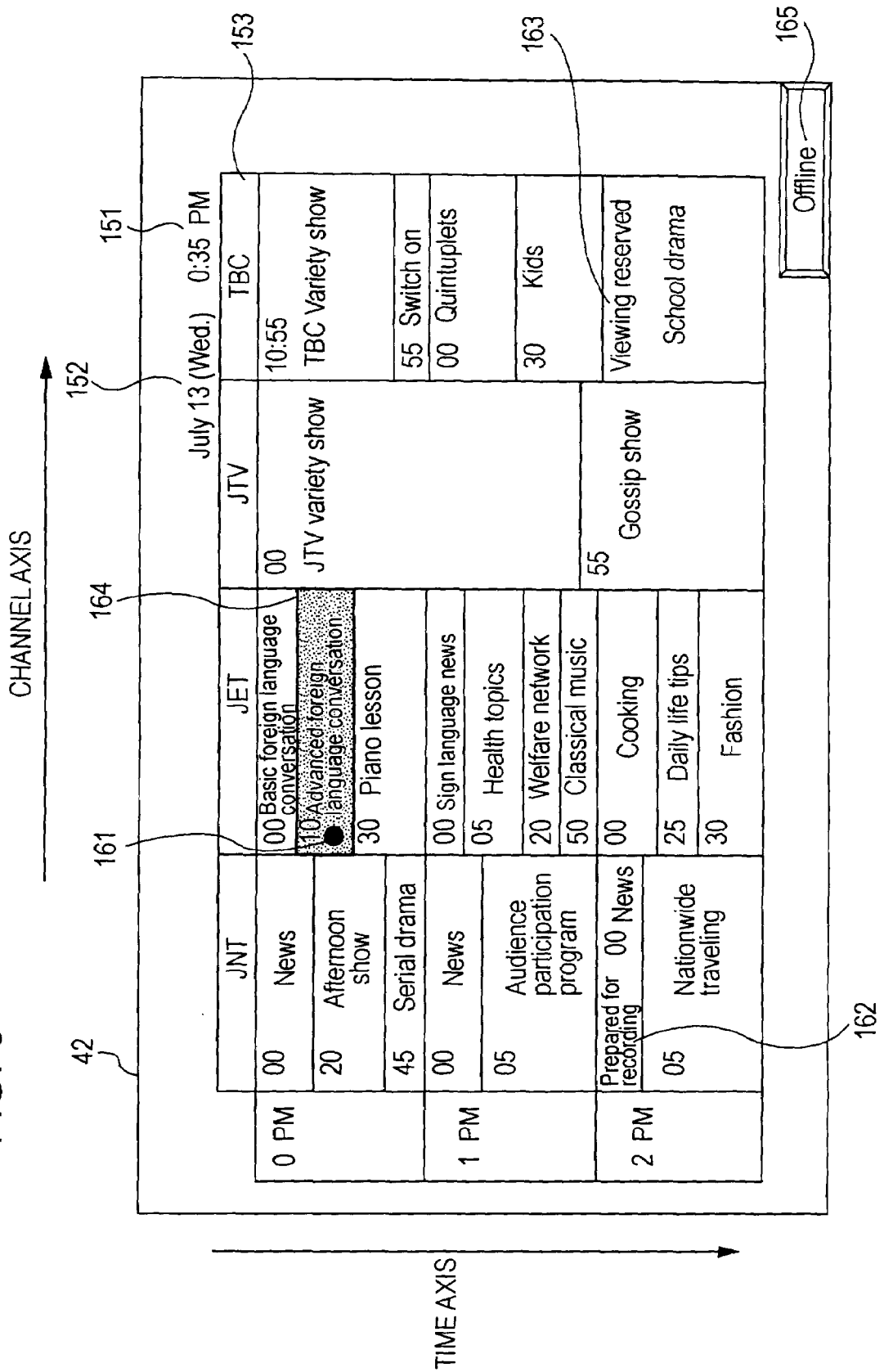
FIG. 6 is an illustration of an example of a program guide that is displayed.

In FIG. 6, areas of programs that are broadcast between the noon and 3 PM on four channels, namely, "JNT", "JET", "JTV", and "TBC", are displayed.

The program guide 153 displayed on the LCD 42 can be scrolled vertically and horizontally according to user's operations of the input unit 47. On the LCD 42, when the program guide 153 is scrolled vertically, areas of programs that are broadcast in other periods are displayed. When the program guide 153 is scrolled horizontally, areas of programs that are broadcast on other channels are displayed.

When the display of the program guide 153 is started, for example, the program guide 153 is displayed so that a broadcast time range of programs that are currently being broadcast is located at the top. In FIG. 6, a time range starting from the noon is displayed at the top, that is, the current time is between the noon and 1 PM.

The recording result icon 161 is a circular-shaped icon indicating success of recording of a program. In FIG. 6, the recording result icon 161 is provided in the area of a program entitled "Advanced foreign language conversation", started at 0:10 PM on the channel "JET". With the recording result icon 161, the user can immediately recognize the success of recording of the program "Advanced foreign language conversation", started at 0:10 PM on the channel "JET".

The recording reservation preparation icon 162 is an icon showing a text string "Prepared for recording", indicating preparation for recording of a program. In FIG. 6, the recording reservation preparation icon 162 is displayed in the area of a program entitled "News", scheduled to start at 2:00 PM on the channel "JNT". That is, in the recording/viewing-reservation-preparation-information storing unit 73 of the display control terminal 21, recording reservation preparation information including a recording reservation setting request of the program entitled "News".

With the recording reservation preparation icon 162, the user can immediately recognize that preparation has been made for reservation for recording of the program "News", scheduled to start at 2:00 PM on the channel "JNT". That is, the user can immediately recognize that although reservation for recording of the program "News", instructed by the user, has not been completed, but the display control terminal 21 is ready for executing processing for reservation of recording as soon as the display control terminal 21 becomes on line.

The viewing reservation icon 163 is an icon showing a text string "Viewing reserved", indicating a reservation for viewing of a program. In FIG. 6, the viewing reservation icon 163 is displayed in the area of the program entitled "School drama", scheduled to start at 2:00 PM on the channel "TBC". With the viewing reservation icon 163, the user can immediately recognize that a reservation has been made for viewing of the program "School drama", scheduled to start at 2:00 PM on the channel "TBC".

The recording result icon 161 is displayed according to display data generated by the recording-result-display generating unit 75, the recording reservation preparation icon 162 is displayed according to display data generated by the recording/viewing-reservation-preparation-display generating unit 77, and the viewing reservation icon 163 is displayed according to display data generated by the recording/viewing-reservation-display generating unit 76.

Furthermore, the program "Advanced foreign language conversation", started at 0:10 PM on the channel "JET", is specified by a cursor 164 and is thereby highlighted. In the program guide 153, the highlighted program area is displayed as distinguished in color or brightness from other areas, or the highlighted program area is displayed as a bright area and other areas are displayed as dark areas or vice versa. Thus, the user can readily recognize the highlighted program.

The user can move the cursor 164 displayed on the program guide 153 by operating the input unit 47, thereby changing the highlighted program.

Furthermore, on the right side under the program guide 153 as viewed in FIG. 6, an off-line icon 165 indicating off-line display of the program guide is displayed. The off-line icon 165 shows a text string "Offline". With the off-line icon 165, the user can immediately recognize that the display control terminal 21 is off line, so that it is not possible to obtain program information and the program guide is displayed according to stored program information. The off-line icon 165 is displayed according to display data generated by the control-display generating unit 78.

In this embodiment, the off-line icon 165 is displayed when the program guide is displayed off line. Furthermore, for example, an on-line icon showing a text string "Online", indicating on-line display of the program guide, may be displayed in the display area of the LCD 42 when the program guide is displayed on line. In this case, the on-line icon displayed with the program guide is displayed according to display data generated by the control-display generating unit 78. Alternatively, it is possible to display the off-line icon 165 when the program guide is displayed off line while not displaying the off-line icon 165, i.e., not displaying any icon, when the program guide is displayed on line.

Furthermore, the user can operate the input unit 47 with the program guide 153 displayed, select a desired program by moving the cursor 164, and instruct recording or viewing of the selected program.

When a reservation of recording or viewing of a program has been instructed by the user, the display control terminal 21 executes a recording/viewing reservation process according to the instruction to make a reservation for recording or viewing of the specified program.

Now, the recording/viewing reservation process executed by the display control terminal 21 will be described with reference to a flowchart shown in FIG. 7. The recording/viewing reservation process is started when the user has operated the input unit 47 to instruct a reservation for recording or viewing of a program and an operation signal corresponding to the user's operation has been supplied from the input unit 47 to the recording/viewing-reservation-setting instructing unit 74.

In step S81, the recording/viewing-reservation-setting instructing unit 74 identifies a program relevant to reservation for recording or viewing, specified by the user, according to the operation signal supplied from the input unit 47. Upon identifying the program relevant to reservation for recording or viewing, the recording/viewing-reservation-setting instructing unit 74 supplies a setting request for instructing reservation for recording or viewing of the identified program to the communication-status checking unit 82. The setting request includes information identifying the program specified by the user, such as the program name, start time, and broadcasting station of the program.

In step S82, the communication-status checking unit 82 checks whether the display control terminal 21 is on line, i.e., whether the display control terminal 21 is connected to the home LAN 13.

More specifically, the communication-status checking unit 82 checks whether the display control terminal 21 is connected to the recording apparatus 24 via the home LAN 13. The communication-status checking unit 82 determines that the display control terminal 21 is on line if the display control terminal 21 is connected to the recording apparatus 24 so that the setting request can be sent to the recording apparatus 24 to instruct reservation for recording or viewing.

If it is determined in step S82 that the display control terminal 21 is on line, the communication-status checking unit 82 supplies the recording/viewing reservation setting request supplied from the recording/viewing-reservation-setting instructing unit 74 to the communication unit 81. Then, the process proceeds to step S83.

In step S83, the device-information obtaining unit 65 obtains device information from a recording apparatus that can carry out communications with the display control terminal 21 connected to the home LAN 13.

For example, the device-information obtaining unit 65 sends a device-information obtaining request for requesting sending of device information, and sends the obtaining request via the communication unit 81 to the recording apparatus 24 connected to the home LAN 13. Then, the communication unit 101 of the recording apparatus 24 receives the device-information obtaining request sent from the display control terminal 21 and supplies the device-information obtaining request to the device-information providing unit 102.

Upon receiving the obtaining request from the communication unit 101, in response to the obtaining request, the device-information providing unit 102 sends the device information identifying the recording apparatus 24 to the display control terminal 21 via the communication unit 101. Then, the communication unit 81 receives the device information sent from the communication unit 101 of the recording apparatus 24 and supplies the device information to the device-information obtaining unit 65. The device-information obtaining unit 65 supplies the device information supplied from the communication unit 81 to the device-information saving unit 66.

In step S84, the device-information saving unit 66 stores the device information supplied from the device-information obtaining unit 65.

In step S85, the recording-apparatus specifying unit 67 reads the device information stored in the device-information saving unit 66 to identify a device relevant to instruction of a reservation for recording or viewing, i.e., a device to which a recording/viewing setting request is to be sent. The recording-apparatus specifying unit 67 supplies the device information of the identified device to the communication unit 81.

The device relevant to instruction of reservation for recording or viewing may be a predetermined device or a device identified by the device information that has been read. For example, if a plurality of devices are connected to the home LAN 13, i.e., if a plurality of pieces of device information has been obtained, a selecting screen for allowing the user to select a device relevant to instruction of reservation for recording or viewing may be displayed on the LCD 42 so that the user can select one of the plurality of devices.

In this case, the control-display generating unit 78 refers to the device information stored in the device-information saving unit 66, generates display data for displaying the selecting screen, and supplies the display data to the LCD 42 via the combining unit 79 and the display control unit 80.

More specifically, if it is not possible to identify the relevant device, for example, because the relevant device is not connected to the home LAN 13, the process proceeds to step S91, in which reservation preparation information is stored.

In step S86, the communication unit 81 sends the setting request supplied from the communication-status checking unit 82 to the device identified by the device information supplied from the recording-apparatus specifying unit 67, i.e., to the recording apparatus 24.

Then, the communication unit 101 of the recording apparatus 24 receives the setting request sent from the communication unit 81 of the display control terminal 21, and supplies the setting request to the recording/viewing-reservation-setting unit 103. In response to the setting request supplied from the communication unit 101, the recording/viewing-reservation setting unit 103 supplies reservation information indicating a program for which a reservation for recording or viewing is made according to the setting request to the recording/viewing-reservation-information storing unit 104. The recording/viewing-reservation-information storing unit 104 stores the reservation information supplied from the recording/viewing-reservation setting unit 103.

The recording/viewing-reservation-information obtaining unit 70 of the display control terminal 21 sends a request for obtaining reservation information for recording or viewing of a program to the recording apparatus 24 via the communication unit 81. The communication unit 101 of the recording apparatus 24 receives the obtaining request sent from the communication unit 81 of the display control terminal 21 and supplies the obtaining request to the recording/viewing-reservation-information storing unit 104.

In response to the obtaining request supplied from the communication unit 101, the recording/viewing-reservation-information storing unit 104 supplies the stored reservation information for recording or viewing to the communication unit 101. The communication unit 101 sends the reservation information supplied from the recording/viewing-reservation-information storing unit 104 to the display control terminal 21.

In step S87, the communication unit 81 receives the recording/viewing reservation information sent from the recording apparatus 24, and supplies the reservation information to the recording/viewing-reservation-information obtaining unit 70. The recording/viewing-reservation-information obtaining unit 70 supplies the reservation information supplied from the communication unit 81 to the recording/viewing-reservation-information storing unit 71.

In step S88, the recording/viewing-reservation-information storing unit 71 stores the reservation information for recording or viewing of a program, supplied from the recording/viewing-reservation-information obtaining unit 70. This concludes the recording/viewing reservation process. Thus, the reservation for recording or viewing of a program according to an instruction by the user is completed. When the time of start of broadcasting of the program comes, the recording apparatus 24 receives broadcast waves of the program, and records the program or supplies video and audio signals obtained from the received broadcast waves to the video display and audio playback apparatus 25 to play the program. That is, the recording/viewing-reservation executing unit 106 records a program or play a program according to the reservation information stored in the recording/viewing-reservation-information storing unit 104.

More specifically, if it is not possible to make a reservation for recording or viewing, for example, because the time of broadcasting of the program relevant to instruction of reservation for recording according to the setting request received by the recording apparatus 24 overlaps the time of broadcasting of a program for which a reservation has already been made, the recording/viewing-reservation-information storing unit 104 sends information indicating a failure of reservation for recording or viewing to the display control terminal 21 via the communication unit 101 in response to the reservation-information obtaining request supplied from the communication unit 101.

Upon receiving the information indicating a failure of reservation, depending on the reason of failure indicated by the information, the display control terminal 21 again executes the processing in steps S86 to S88 to retry reservation for recording or viewing, or executes processing for displaying a message indicating occurrence of an error and exiting the recording/viewing reservation process.

If it is determined in step S82 that the display control terminal 21 is not on line, i.e., that the display control terminal 21 is off line, the communication-status checking unit 82 supplies the setting request for recording or viewing of a program, supplied from the recording/viewing-reservation-setting instructing unit 74, to the recording/viewing-reservation-preparation-information obtaining unit 72, and instructs the recording-apparatus specifying unit 67 via the communication unit 81 to identify a device relevant to instruction of reservation for recording or viewing. Then, the process proceeds to step S89.

In step S89, the recording-apparatus specifying unit 67 checks whether device information is stored in the device-information saving unit 66. If it is determined in step S89 that device information is not stored, it is not possible to identify a device relevant to instruction of reservation for recording or viewing, so that step S90 is skipped and the process proceeds to step S91.

On the other hand, if it is determined in step S89 that device information is stored, in step S90, the recording-apparatus specifying unit 67, in an off-line state, identifies a device relevant to instruction of reservation for recording or viewing. That is, the recording-apparatus specifying unit 67 reads the device information already obtained and stored in the device-information saving unit 66, and identifies a relevant device on the basis of the device information. Then, the recording-apparatus specifying unit 67 supplies the device information of the identified device to the recording/viewing-reservation-preparation-information obtaining unit 72 via the communication unit 81.

Instead of identifying a relevant device in step S90, a relevant device may be identified when the display control terminal 21 sends a recording/viewing reservation setting request stored as reservation preparation information to the recording apparatus 24.

When a relevant device has been identified in step S90 or if it is determined in step S89 that device information is not stored, in step S91, the recording/viewing-reservation-preparation-information obtaining unit 72 obtains recording/viewing reservation preparation information and supplies the recording/viewing reservation preparation information to the recording/viewing-reservation-preparation-information storing unit 73.

More specifically, as reservation preparation information, the recording/viewing-reservation-preparation-information obtaining unit 72 obtains the setting request for reservation for recording or viewing of a program, supplied from the communication-status checking unit 82 in step S82, and the device information supplied from the recording-apparatus specifying unit 67 in step S90. If it is determined in step S89 that device information is not stored, so that device information is not supplied, the recording/viewing-reservation-preparation-information obtaining unit 72 obtains only the setting request for reservation for recording or viewing as reservation preparation information.

In step S92, the recording/viewing-reservation-preparation-information storing unit 73 stores the reservation preparation information for recording or viewing of a program, supplied from the recording/viewing-reservation-preparation-information obtaining unit 72. This concludes the recording/viewing reservation process.

As described above, when the display control terminal 21 is on line, the display control terminal 21 sends a setting request to the recording apparatus 24 to make a reservation for recording or viewing of a program. On the other hand, when the display control terminal 21 is off line, the display control terminal 21 stores information including a setting request as reservation preparation information.

As described above, the display control terminal 21 sends a setting request to the recording apparatus 24 to make a reservation for recording or viewing of a program when the display control terminal 21 is on line, and the display control terminal 21 stores information including a setting request as reservation preparation information when the display control terminal 21 is off line. When the display control terminal 21 is switched from off line to on line, the display control terminal 21 sends the setting request to the recording apparatus 24 to immediately make the reservation for recording or viewing of a program specified by the user. Accordingly, even when it is not possible to connect the display control terminal 21 to the home LAN 13, for example, when the user has brought out the display control terminal 21 out of home, the user can readily have a program guide displayed and make a reservation for recording or viewing of a program.

When connection to the home LAN 13 is instructed, the display control terminal 21 is activated, or a certain program is executed according to a user's operation of the input unit 47 so that the display control terminal 21 starts access to the home LAN 13, the display control terminal 21 executes a setting-request sending process to send a setting request for recording or viewing of a program, stored as reservation preparation information, to the recording apparatus 24.

Now, the setting-request sending process executed by the display control terminal 21 will be described with reference to a flowchart shown in FIG. 8.

In step S121, the communication-status checking unit 82 checks whether the display control terminal 21 is on line, i.e., whether the display control terminal 21 is connected to the home LAN 13.

If it is determined in step S121 that the display control terminal 21 is on line, the communication-status checking unit 82 instructs the device-information obtaining unit 65 via the communication unit 81 to obtain device information. Then, the process proceeds to step S122.

In step S122, the device-information obtaining unit 65 obtains device information from a recording apparatus that is connected to the home LAN 13 and that can carry out communications with the display control terminal 21.

For example, the device-information obtaining unit 65 generates a device-information obtaining request for requesting sending of device information, and sends the obtaining request via the communication unit 81 to the recording apparatus 24 connected to the home LAN 13. Then, the communication unit 101 of the recording apparatus 24 receives the device-information obtaining request sent from the display control terminal 21 and supplies the device-information obtaining request to the device-information providing unit 102.

Upon receiving the obtaining request from the communication unit 101, in response to the obtaining request, the device-information providing unit 102 sends device information identifying the recording apparatus 24 to the display control terminal 21 via the communication unit 101. Then, the communication unit 81 receives the device information sent from the communication unit 101 of the recording apparatus 24 and supplies the device information to the device-information obtaining unit 65. The device-information obtaining unit 65 supplies the device information supplied from the communication unit 81 to the device-information saving unit 66.

In step S123, the device-information saving unit 66 stores the device information supplied from the device-information obtaining unit 65.

In step S124, the recording/viewing-reservation-preparation-information obtaining unit 72 checks whether reservation preparation information for recording or viewing of a program is stored in the recording/viewing-reservation-preparation-information storing unit 73. If it is determined in step S124 that reservation preparation information is not stored, no setting request as reservation preparation information that is to be sent to the recording apparatus 24 exists, so that the setting-request sending process is exited.

On the other hand, if it is determined in step S124 that preparation reservation information is stored, the recording/viewing-reservation-preparation-information obtaining unit 72 controls the recording/viewing-reservation-preparation-information storing unit 73 so that the reservation preparation information stored in the recording/viewing-reservation-preparation-information storing unit 73 is supplied to the communication unit 81. Under the control of the recording/viewing-reservation-preparation-information obtaining unit 72, the recording/viewing-reservation-preparation-information storing unit 73 supplies all the reservation preparation information stored therein to the communication unit 81.

In step S125, the recording-apparatus specifying unit 67 checks whether a destination to which the setting request as reservation preparation information is to be sent, i.e., whether a device relevant to instruction of reservation for recording or viewing, is specified.

For example, the recording-apparatus specifying unit 67 refers to the reservation preparation information supplied from the recording/viewing-reservation-preparation-information storing unit 73 to the communication unit 81, and determines that a device relevant to instruction of reservation is not specified if device information is not included in the reservation preparation information.

As another example, the recording-apparatus specifying unit 67 also determines that a device relevant to instruction of reservation is not specified if device information is included in the reservation preparation information but the device information is not stored in the device-information saving unit 66, i.e., if the recording apparatus 24 as the device relevant to instruction of reservation is not connected to the home LAN 13.

If it is determined in step S125 that any device relevant to instruction of reservation is not specified, in step S126, the recording-apparatus specifying unit 67 identifies a device relevant to instruction of reservation for recording or viewing of a program.

For example, the control-display generating unit 78 refers to the device information stored in the device-information saving unit 66, generates display data of a selecting screen for allowing the user to select a device relevant to instruction of reservation, and supplies the display data to the LCD 42 via the combining unit 79 and the display control unit 80 so that the selecting screen is displayed on the LCD 42. Then, when the user has selected a device relevant to instruction of reservation by operating the input unit 47 with reference to the selecting screen, the recording-apparatus specifying unit 67 identifies the relevant device according to an operation signal supplied from the input unit 47 according to the user's operation. Then, the recording-apparatus specifying unit 67 supplies the device information of the identified device to the communication unit 81.

In step S126, alternatively, the recording-apparatus specifying unit 67 may select a device satisfying a certain condition as a device relevant to instruction of reservation, such as a device identified by device information that is obtained first after the display control terminal 21 has become on line, so that the user need not perform an operation for selecting a relevant device.

More specifically, if any device relevant to instruction of reservation is not specified, for example, because the recording apparatus 24 is not connected to the home LAN 13, the recording/viewing-reservation-preparation-information obtaining unit 72 obtains the reservation preparation information supplied from the recording/viewing-reservation-preparation-information storing unit 73 to the communication unit 81 and supplies the reservation preparation information to the recording/viewing-reservation-preparation-information storing unit 73, and the reservation preparation information is again stored in the recording/viewing-reservation-preparation-information storing unit 73.

When a device relevant to instruction of reservation has been specified in step S126, the process proceeds to step S127.

If it is determined in step S125 that a device relevant to instruction of reservation is specified, the recording-apparatus specifying unit 67 reads the device information of the identified relevant device from the device-information saving unit 66 and supplies the device information to the communication unit 81. Then, the process proceeds to step S127.

In step S127, the communication unit 81 sends the setting request as reservation preparation information, supplied from the recording/viewing-reservation-preparation-information storing unit 73, to the device identified by the device information supplied from the recording-apparatus specifying unit 67, i.e., to the recording apparatus 24.

Then, the communication unit 101 of the recording apparatus 24 receives the setting request sent from the communication unit 81 of the display control terminal 21, and supplies the setting request to the recording/viewing-reservation setting unit 103. In response to the setting request supplied from the communication unit 81, the recording/viewing-reservation setting unit 103 supplies reservation information of a program specified by the setting request to the recording/viewing-reservation-information storing unit 104. The recording/viewing-reservation-information storing unit 104 stores the reservation information supplied from the recording/viewing-reservation setting unit 103.

The recording/viewing-reservation-information obtaining unit 70 of the display control terminal 21 sends a request for obtaining reservation information for recording or viewing of a program to the recording apparatus 24 via the communication unit 81. The communication unit 101 of the recording apparatus 24 receives the obtaining request sent from the communication unit 81 of the display control terminal 21, and supplies the obtaining request to the recording/viewing-reservation-information storing unit 104.

In response to the obtaining request supplied from the communication unit 101, the recording/viewing-reservation-information storing unit 104 supplies recording/viewing reservation information stored therein to the communication unit 101. Then, the communication unit 101 sends the reservation information supplied from the recording/viewing-reservation-information storing unit 104 to the display control terminal 21.

In step S128, the communication unit 81 receives the recording/viewing reservation information sent from the recording apparatus 24, and supplies the reservation information to the recording/viewing-reservation-information obtaining unit 70. The recording/viewing-reservation-information obtaining unit 70 supplies reservation information supplied from the communication unit 81 to the recording/viewing-reservation-information storing unit 71.

In step S129, the recording/viewing-reservation-information storing unit 71 stores the recording/viewing reservation information supplied from the recording/viewing-reservation-information obtaining unit 70. This concludes the setting-request sending process. Thus, a setting request for reservation for recording or viewing, not yet sent to the recording apparatus 24 since the display control terminal 21 has been off line, can be sent to the recording apparatus 24, whereby the reservation for recording or viewing of a program specified by the user is completed.

Steps S125 to S129 are each executed for each piece of reservation preparation information stored in the recording/viewing-reservation-preparation-information storing unit 73. That is, if a plurality of pieces of reservation preparation information is stored in the recording/viewing-reservation-preparation-information storing unit 73, steps S125 to S129 are executed for each of the plurality of pieces of reservation preparation information.

If it is determined in step S121 that the display control terminal 21 is not on line, the display control unit 80 displays an image indicating occurrence of an error on the LCD 42. Then, the setting-request sending process is exited.

More specifically, for example, the control-display generating unit 78 generates display data of an image indicating occurrence of an error, including a message saying "Connection to the network failed." or the like, and supplies the display data to the display control unit 80 via the combining unit 79. The display control unit 80 supplies the display data supplied from the control-display generating unit 78 to the LCD 42 so that the image is displayed on the LCD 42.

As described above, when the display control terminal 21 has become on line, the display control terminal 21 sends a setting request stored as reservation preparation information to the recording apparatus 24, thereby making a reservation for recording or viewing of a program.

As described above, when the display control terminal 21 has become online, the display control terminal 21 sends a setting request stored as reservation preparation information to the recording apparatus 24, thereby making a reservation for recording or viewing of a program. Thus, the user can make a reservation for recording or viewing of a program anytime regardless of the environment where the display control terminal 21 is used, i.e., regardless of whether the display control terminal 21 is connected to the home LAN 13.

This serves to prevent cases where the user forgets to make a reservation for recording or viewing of a program that the user wishes to record or view because the user is not allowed to make a reservation immediately.

According to the above description, the program-information storing unit 63 that stores program information and the recording/viewing-reservation-preparation-information storing unit 73 that stores reservation preparation information are formed as parts of the data saving unit 46 formed of a hard disk, flash memory, or the like included in the display control terminal 21. Alternatively, the data saving unit 46 forming the program-information storing unit 63 and the recording/viewing-reservation-preparation-information storing unit 73 may be formed of a removable medium that can be connected to or disconnected from the display control terminal 21, such as a semiconductor memory.

For example, when the program-information storing unit 63 and the recording/viewing-reservation-preparation-information storing unit 73, i.e., the data saving unit 46, can be connected to or disconnected from the display control terminal 21, if program information or reservation preparation information is stored directly in the program-information storing unit 63 or the recording/viewing-reservation-preparation-information storing unit 73 of the data saving unit 46, the program information or reservation preparation information might be copied and used in an unauthorized manner.

By storing program information or reservation preparation information in an encrypted form, it is possible to allow only the display control terminal 21 to use the program information or reservation preparation information, or to allow only the display control terminal 21 and display control terminals of the same device type as the display control terminal 21 to use the program information or reservation preparation information. This serves to protect copyrights of program information or reservation preparation information and to prevent unauthorized use of data.

For example, if program information is to be stored in an encrypted form, the program-information storing unit 63 is configured as shown in FIG. 9.

Referring to FIG. 9, the program-information storing unit 63 includes an information encrypting unit 191, a storing unit 192, and an information decrypting unit 193.

The information encrypting unit 191 encrypts program information supplied from the program-information obtaining unit 62 according to a predetermined encryption algorithm, such as DES (Data Encryption Standard) or RSA (Rivest Shamir Adleman), and supplies the encrypted program information to the storing unit 192.

The storing unit 192 stores the encrypted program information supplied from the information encrypting unit 191, and supplies the program information stored therein to the information decrypting unit 193 in response to a request from the information decrypting unit 193.

The information decrypting unit 193 decrypts the program information supplied from the storing unit 192 and outputs the decrypted program information. That is, the information decrypting unit 193 decrypts the program information according to a decryption algorithm corresponding to the encryption algorithm used in the information encrypting unit 191, and supplies the decrypted program information to the program-guide generating unit 64.

Figure 5:
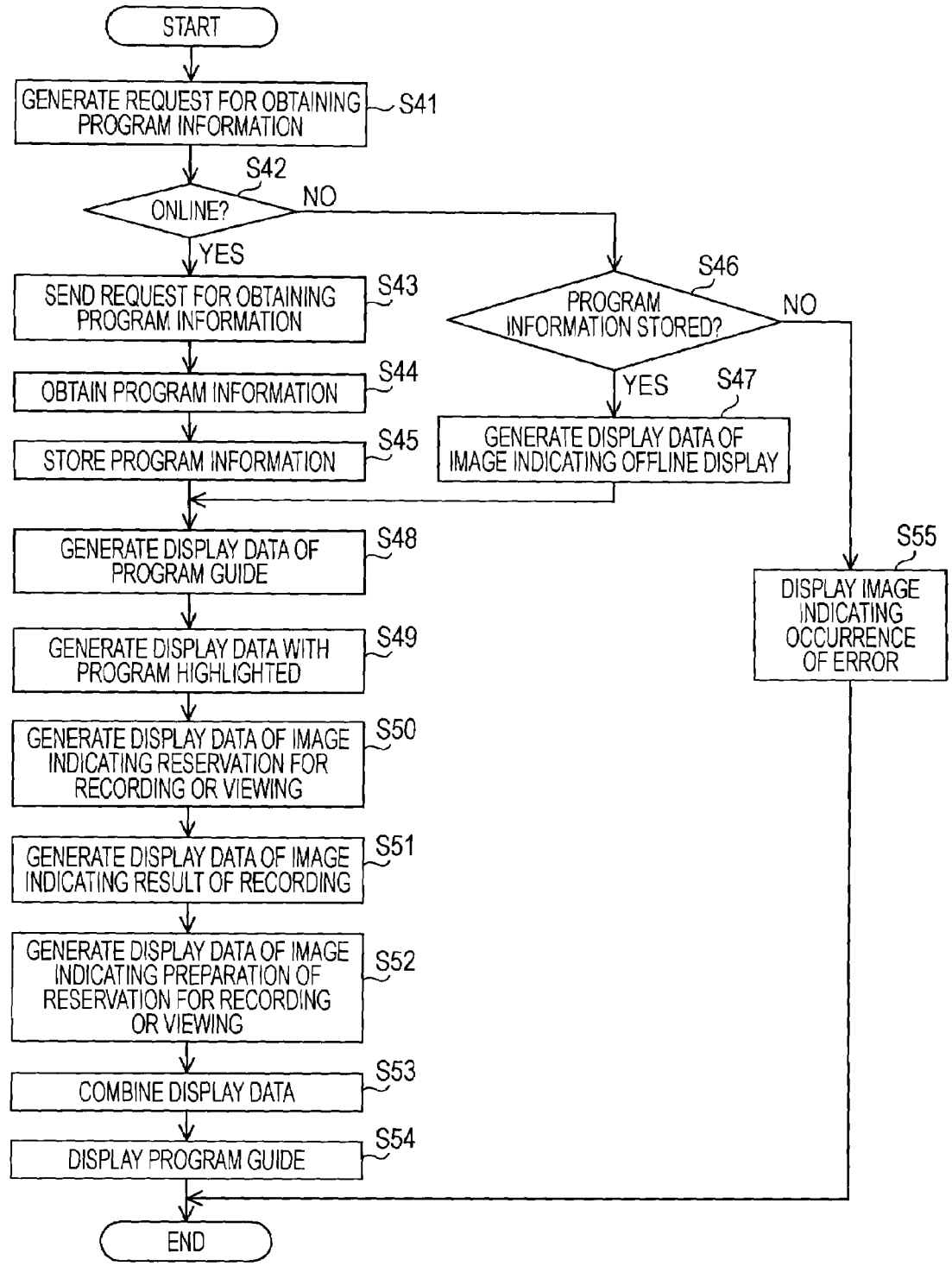
FIG. 5 is a flowchart of a program-guide displaying process.

Thus, for example, in step S45 shown in FIG. 5, the information encrypting unit 191 encrypts the program information supplied from the program-information obtaining unit 62 according to a predetermined encryption algorithm, and the storing unit 192 stores the program information encrypted by the information encrypting unit 191.

Then, in step S48, the information decrypting unit 193 decrypts the program information stored in the storing unit 192 according to a decryption algorithm corresponding to the encryption algorithm used in the information encrypting unit 191, and supplies the decrypted program information to the program-guide generating unit 64.

By encrypting program information as described above, copyright of the program information can be protected from infringement.

Figure 10:
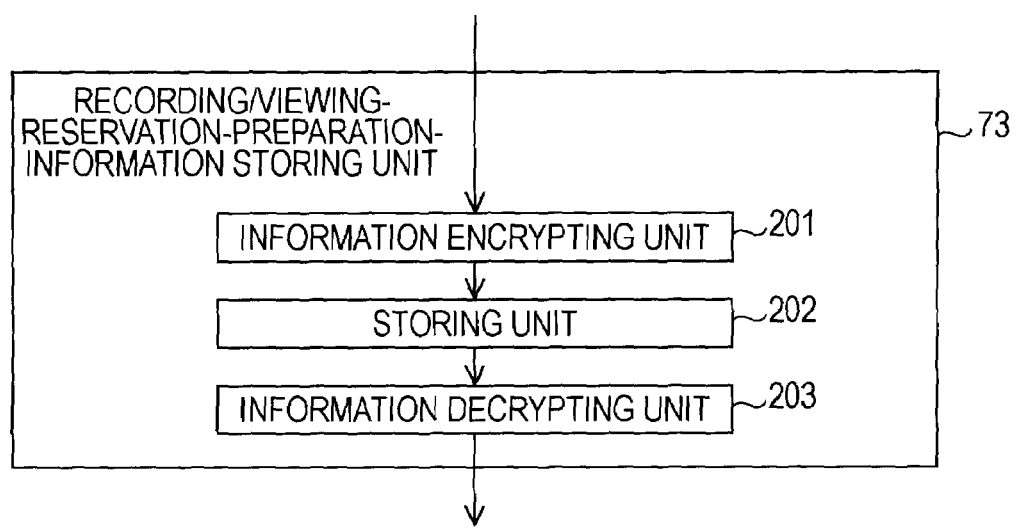
FIG. 10 is a block diagram showing an example configuration of a recording/viewing-reservation-preparation-information storing unit.

Similarly to the case of program information, if reservation preparation information is to be stored in an encrypted form, for example, the recording/viewing-reservation-preparation-information storing unit 73 is configured as shown in FIG. 10.

Referring to FIG. 10, the recording/viewing-reservation-preparation-information storing unit 73 includes an information encrypting unit 201, a storing unit 202, and an information decrypting unit 203.

The information encrypting unit 201 encrypts reservation preparation information supplied from the recording/viewing-reservation-preparation-information obtaining unit 72 according to a predetermined encryption algorithm, such as DES or RSA, and supplies the encrypted reservation preparation information to the storing unit 202.

The storing unit 202 stores the encrypted reservation preparation information supplied from the information encrypting unit 201, and supplies the reservation preparation information stored therein to the information decrypting unit 203 in response to a request from the information decrypting unit 203.

The information decrypting unit 203 decrypts the reservation preparation information supplied from the storing unit 202, and outputs the decrypted reservation preparation information. That is, the information decrypting unit 203 decrypts the reservation preparation information according to a decryption algorithm corresponding to the encryption algorithm used in the information encrypting unit 201, and supplies the decrypted reservation preparation information to the recording/viewing-reservation-preparation-display generating unit 77 or the communication unit 81.

Figure 7:
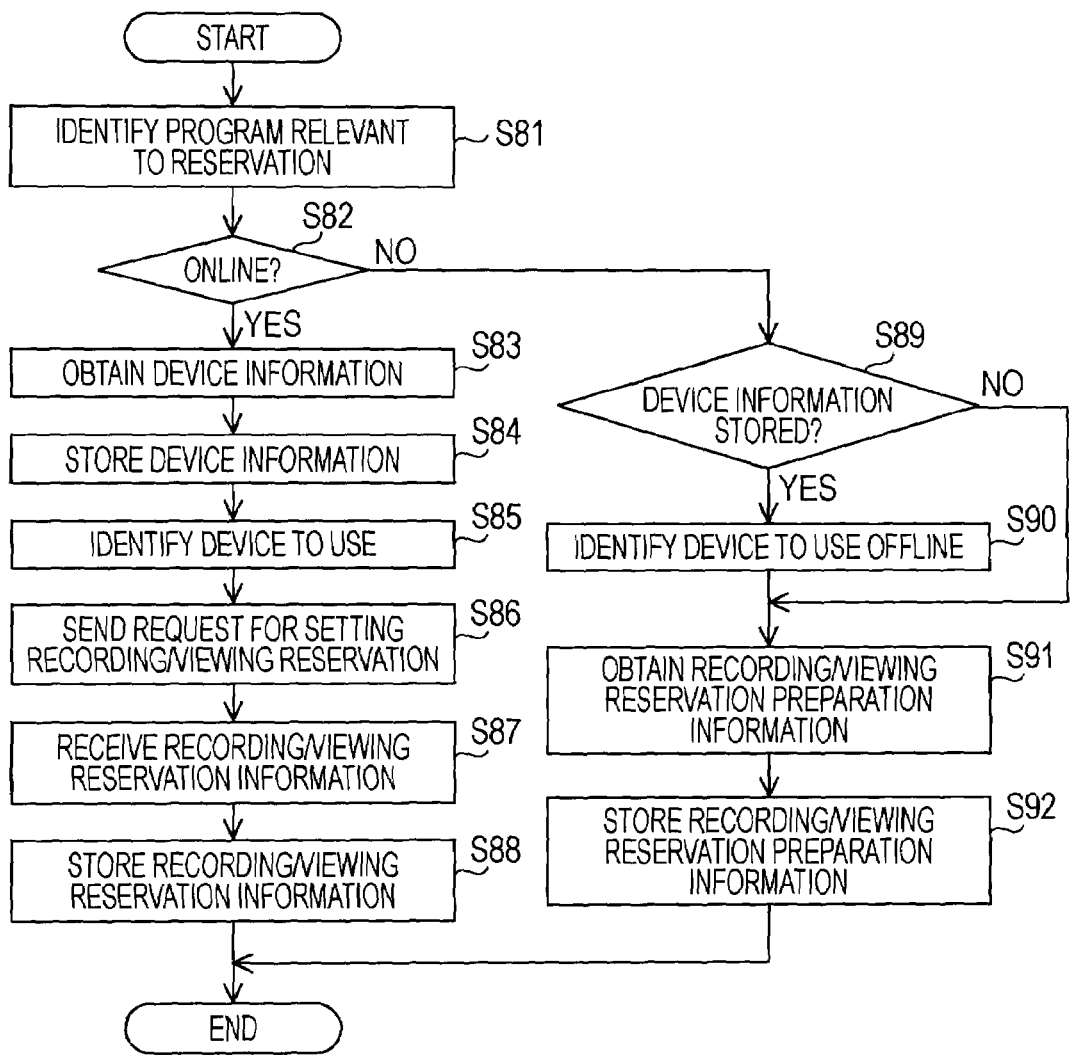
FIG. 7 is a flowchart of a recording/viewing reservation process.

Thus, for example, in step S92 shown in FIG. 7, the information encrypting unit 201 encrypts reservation preparation information supplied from the recording/viewing-reservation-preparation-information obtaining unit 72 according to a predetermined encryption algorithm, and the storing unit 202 stores the reservation preparation information encrypted by the information encrypting unit 201.

Then, for example, if it is determined in step S124 shown in FIG. 8 that reservation preparation information is stored, the information decrypting unit 203 decrypts the reservation preparation information stored in the storing unit 202 according to a decryption algorithm corresponding to the encryption algorithm used in the information encrypting unit 201, and supplies the decrypted reservation preparation information to the communication unit 81.

By encrypting reservation preparation information as described above, improper reuse of the reservation preparation information can be prevented.

In the description given above, processing for displaying a program guide and processing for making a reservation for recording or viewing have been described in the context of television broadcast programs as an example, without limitation to television broadcast programs, processing can be executed in similar manners for moving-picture and/or audio content, such as programs that are distributed via a communication network, such as the Internet. In this case, a program guide of the content is displayed on the display control terminal 21, and the display control terminal 21 sends a setting request for reservation for recording or viewing of the content to the recording apparatus 24 or stores a setting request as reservation preparation information.

The series of processes described above may be executed by hardware or by software. When the series of processes are executed by software, programs constituting the software are installed from a program recording medium onto a computer embedded in special hardware or onto a general-purpose computer or the like that is capable of executing various functions with various programs installed thereon.

FIG. 1 shows an example configuration of a personal computer that executes the series of processes according to programs. In a personal computer 301, a central processing unit (CPU) 311 executes various processes according to programs stored in a read-only memory (ROM) 312 or a storage unit 318. A random access memory (RAM) 313 stores programs executed by the CPU 311, data, and so forth as needed. The CPU 311, the ROM 312, and the RAM 313 are connected to each other via a bus 314.

The CPU 311 is also connected to an input/output interface 315 via a bus 314. The input/output interface 315 is connected to an input unit 316 including, for example, a keyboard, a mouse, a microphone, and so forth, and to an output unit 317 including, for example, a display, a speaker, and so forth. The CPU 311 executes various processes according to instructions input from the input unit 316. Then, the CPU 311 outputs results of the processes to the output unit 317.

The input/output interface 315 is also connected to a storage unit 318. For example, the storage unit is formed of a hard disk, and stores programs executed by the CPU 311 and various types of data. A communication unit 319 carries out communications with external devices via a network, such as the Internet or a local area network.

Furthermore, programs may be obtained via the communication unit 319 and stored in the storage unit 318.

The input/output interface 315 is also connected to a drive 320. When a removable medium 331, such as a magnetic disc, an optical disc, a magneto-optical disc, or a semiconductor memory, is loaded on the drive 320, the drive 320 drives the removable medium 331 to obtain programs, data, or the like recorded thereon. The programs, data or the like that has been obtained is transferred to and stored in the storage unit 318 as needed.

Figure 11:
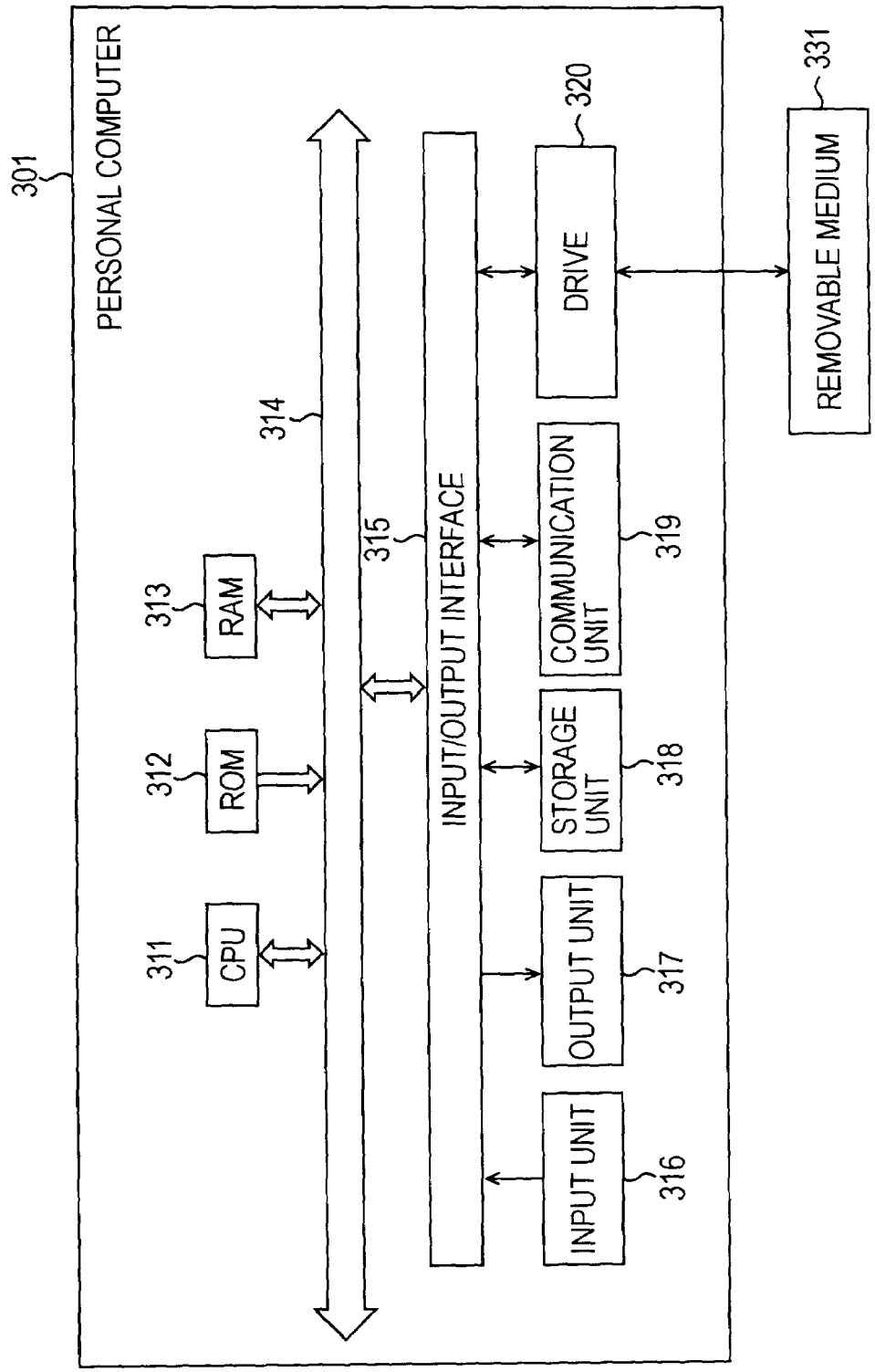
FIG. 11 is a block diagram showing an example configuration of a personal computer.

As shown in FIG. 11, the program recording medium for storing programs that are installed onto a computer for execution by the computer may be the removable medium 331, which is a package medium such as a magnetic disc (e.g., a flexible disc), an optical disc (e.g., a CD-ROM (compact disc read-only memory) or a DVD (digital versatile disc)), a magneto-optical disc, or a semiconductor memory, or the ROM 312 or the hard disk of the storage unit 318 temporarily or permanently storing the programs. The programs can be stored on the program recording medium as needed via the communication unit 319, which is an interface such as a router or a modem, using wired or wireless communication medium such as a local area network, the Internet, or digital satellite broadcasting.

The steps defining the programs stored on the program recording medium need not necessarily be executed in the orders described herein, and may include steps that are executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A portable terminal comprising:
   obtaining means for obtaining program information via a network from a providing apparatus that provides the program information, the program information being used to display a program guide;
   program information storing means for storing the program information obtained;
   displaying means for displaying the program guide according to the obtained program information;
   display controlling means for controlling display of the program guide,
   wherein when an instruction for displaying a program guide is received after the program information is obtained by the obtaining means, the portable terminal is connected to the providing apparatus via the network, and an update time of the program information stored in the program information storing means does not coincide with an update time of new program information at the providing apparatus, the obtaining means obtains the new program information from the providing apparatus in response to the instruction for displaying the program guide and the display controlling means uses the new program information to display the program guide, and
   when an instruction for displaying a program guide is received after the program information is obtained by the obtaining means, and the portable terminal is not connected to the providing apparatus via the network, the display controlling means uses the program information stored in the program information storing means to display the program guide in response to the instruction for displaying the program guide;
   generating means for generating a setting request for requesting reservation for recording or viewing of a specified program to a device that is connected to the portable terminal via the network and that records the program or controls display of the program, wherein the generating means for generating, in response to not determining an identifier of the device while the portable terminal is offline, determines an unknown identifier of a device on the network after the portable terminal becomes online by automatically selecting the device on the network that satisfies a pre-established condition without a user selecting the device on the network;
   means for displaying a recording reservation preparation icon on the displayed program guide when the portable terminal is offline, the recording reservation preparation icon indicating that the setting request for requesting reservation for the recording or the viewing of the specified program has been generated and that the setting request will be sent to the device in response to the portable terminal being connected to the device; and
   sending means for sending, when the portable terminal is connected to the device via the network, the setting request generated by the generating means to the automatically selected device on the network with the identifier of the automatically selected device on the network.

2. The portable terminal according to claim 1, wherein the displaying means displays an image indicating that the portable terminal is not connected to the providing apparatus, together with the program guide, if the portable terminal is not connected to the providing apparatus via the network.

3. The portable terminal according to claim 1, further comprising:
   encrypting means for encrypting the program information, wherein the program information storing means stores the program information encrypted by the encrypting means.

4. The portable terminal according to claim 3, further comprising:
   decrypting means for decrypting the encrypted program information stored in the program information storing means,
   wherein the displaying means displays the program guide according to the program information decrypted by the decrypting means.

5. The portable terminal according to claim 1, wherein the sending means sends the setting request stored in setting-request storing means when the portable terminal becomes connected to the device via the network.

6. The portable terminal according to claim 1, further comprising:
   encrypting means for encrypting the setting request, wherein setting-request storing means stores the setting request encrypted by the encrypting means.

7. A displaying method of a portable terminal that displays a program guide according to program information for displaying the program guide, the displaying method comprising the steps of:
   obtaining, by the portable terminal, initial program information from a providing apparatus that provides the program information via a network;
   controlling storage of the program information so that the obtained program information is stored in program information storing unit; and
   when an instruction for displaying a program guide is received after the initial program information is obtained by the obtaining, the portable terminal is connected to the providing apparatus via the network, and an update time of the initial program information does not coincide with an update time of new program information at the providing apparatus, obtaining the new program information from the providing apparatus in response to the instruction for displaying the program guide and using the new program information to display the program guide, and when an instruction for displaying a program guide is received after the initial program information is obtained by the obtaining, and the portable terminal is not connected to the providing apparatus via the network, using the initial program information stored in the program information storing unit to display the program guide in response to the instruction for displaying the program guide;

generating, by the portable terminal, a setting request for requesting reservation for recording or viewing of a specified program to a device that is connected to the portable terminal via the network and that records the program or controls display of the program, wherein the generating includes, in response to not determining an identifier of the device while the portable terminal is offline, determining an unknown identifier of a device on the network after the portable terminal becomes online by automatically selecting the device on the network that satisfies a pre-established condition without a user selecting the device on the network;

displaying a recording reservation preparation icon on the displayed program guide when the portable terminal is offline, the recording reservation preparation icon indicating that the setting request for requesting reservation for the recording or the viewing of the specified program has been generated and that the setting request will be sent to the device in response to the portable terminal being connected to the device; and sending, by the portable terminal, when the portable terminal is connected to the device via the network, the setting request to the automatically selected device on the network with the identifier of the automatically selected device on the network.

8. The displaying method according to claim 7, further comprising:
controlling the display of the program guide so that an image indicating that the portable terminal is not connected to the providing apparatus is displayed, together with the program guide, if the portable terminal is not connected to the providing apparatus via the network.

9. The displaying method according to claim 7, further comprising the step of:
encrypting the program information,
wherein the storage of the program information is controlled so that the encrypted program information is stored in the program information storing unit means.

10. The displaying method according to claim 9, further comprising the step of:
decrypting the encrypted program information stored in the program information storing unit,
wherein the display of the program guide is controlled so that the program guide is displayed according to the decrypted program information.

11. The displaying method according to claim 7, further comprising:
transmitting the setting request stored in setting-request storing means when the portable terminal becomes connected to the device via the network.

12. The displaying method according to claim 7, further comprising the step of:
encrypting the setting request, wherein the encrypted setting request is stored in setting-request storing means.

13. A non-transitory computer readable storage medium storing a program for causing a computer to execute processing for displaying a program guide on a portable terminal according to program information for displaying the program guide, the program comprising the steps of:

when an instruction for displaying a program guide is received, newly obtaining initial program information from a providing apparatus that provides the program information if the portable terminal is connected to the providing apparatus via a network;

controlling storage of the program information so that the newly obtained program information is stored in program information storing means for storing program information; and when an instruction for displaying a program guide is received after the initial program information is obtained by the obtaining, the portable terminal is connected to the providing apparatus via the network, and an update time of the program information stored in the program information storing means does not coincide with an update time of new program information at the providing apparatus, obtaining the new program information from the providing apparatus in response to the instruction for displaying the program guide and using the new program information to display the program guide, and when an instruction for displaying a program guide is received after the initial program information is obtained by the obtaining, and the portable terminal is not connected to the providing apparatus via the network, using the initial program information stored in the program information storing means to display the program guide in response to the instruction for displaying the program guide;

generating, by the portable terminal, a setting request for requesting reservation for recording or viewing of a specified program to a device that is connected to the portable terminal via the network and that records the program or controls display of the program, wherein the generating includes, in response to not determining an identifier of the device while the portable terminal is offline, determining an unknown identifier of a device on the network after the portable terminal becomes online by automatically selecting the device on the network that satisfies a pre-established condition without a user selecting the device on the network;

displaying a recording reservation preparation icon on the displayed program guide when the portable terminal is offline, the recording reservation preparation icon indicating that the setting request for requesting reservation for the recording or the viewing of the specified program has been generated and that the setting request will be sent to the device in response to the portable terminal being connected to the device; and sending, by the portable terminal, when the portable terminal is connected to the device via the network, the setting request to the automatically selected device on the network with the identifier of the automatically selected device on the network.

14. A portable terminal comprising:
an obtaining unit configured to obtain program information via a network from a providing apparatus that provides the program information, the program information being used to display a program guide;
a program information storing unit configured to store the program information obtained;

a displaying unit configured to display the program guide according to the obtained program information;

a display controlling unit configured to control display of the program guide so that the program guide is displayed according to the program information stored in the program information storing unit, wherein when an instruction for displaying a program guide is received after the program information is obtained by the obtaining unit, the portable terminal is connected to the providing apparatus via the network, and an update time of the program information stored in the program information storing unit does not coincide with an update time of new program information at the providing apparatus, the obtaining unit obtains the new program information from the providing apparatus in response to the instruction for displaying the program guide and the display controlling unit uses the new program information to display the program guide, and when an instruction for displaying a program guide is received after the program information is obtained by the obtaining unit, and the portable terminal is not connected to the providing apparatus via the network, the display controlling unit uses the program information stored in the program information storing unit to display the program guide in response to the instruction for displaying the program guide;

a processor that generates a setting request for requesting reservation for recording or viewing of a specified program to a device that is connected to the portable terminal via the network and that records the program or controls display of the program, wherein the processor, in response to not determining an identifier of the device while the portable terminal is offline, determines an unknown identifier of a device on the network after the portable terminal becomes online by automatically selecting the device on the network that satisfies a pre-established condition without a user selecting the device on the network, wherein the display controlling unit displays a recording reservation preparation icon on the displayed program guide when the portable terminal is offline, the recording reservation preparation icon indicating that the setting request for requesting reservation for the recording or the viewing of the specified program has been generated and that the setting request will be sent to the device in response to the portable terminal being connected to the device; and a transmitter that transmits, when the portable terminal is connected to the device via the network, the setting request to the automatically selected device on the network with the identifier of the automatically selected device on the network.

\* \* \* \* \*